United States Patent
Strnad et al.

(10) Patent No.: US 10,527,474 B2
(45) Date of Patent: *Jan. 7, 2020

(54) YIELD MONITORING APPARATUS, SYSTEMS AND METHODS

(71) Applicant: Precision Planting LLC, Tremont, IL (US)

(72) Inventors: Michael D. Strnad, Delavan, IL (US); Justin L. Koch, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 308 days.

This patent is subject to a terminal disclaimer.

(21) Appl. No.: 15/362,802

(22) Filed: Nov. 28, 2016

(65) Prior Publication Data

US 2017/0074700 A1  Mar. 16, 2017

Related U.S. Application Data

(63) Continuation of application No. 14/237,844, filed as application No. PCT/US2012/050341 on Aug. 10, 2012, now Pat. No. 9,506,786.

(60) Provisional application No. 61/644,367, filed on May 8, 2012, provisional application No. 61/522,153, filed on Aug. 10, 2011.

(51) Int. Cl.
| | |
|---|---|
| *G01F 1/80* | (2006.01) |
| *A01D 41/127* | (2006.01) |
| *G01G 11/04* | (2006.01) |
| *G01G 19/12* | (2006.01) |
| *G01F 1/20* | (2006.01) |
| *A01D 61/00* | (2006.01) |

(52) U.S. Cl.
CPC ............ *G01F 1/80* (2013.01); *A01D 41/1272* (2013.01); *A01D 61/00* (2013.01); *G01F 1/20* (2013.01); *G01G 11/04* (2013.01); *G01G 19/12* (2013.01)

(58) Field of Classification Search
CPC ........................................................ G01F 1/80
USPC ............................................ 702/128; 73/861
See application file for complete search history.

(56) References Cited

U.S. PATENT DOCUMENTS

| | | | |
|---|---|---|---|
| 5,318,475 A | | 6/1994 | Schrock et al. |
| 5,343,761 A | * | 9/1994 | Myers .................... A01C 7/105 73/861 |
| 5,369,603 A | | 11/1994 | Myers |
| 5,561,250 A | | 10/1996 | Myers |
| 5,686,671 A | | 11/1997 | Nelson et al. |
| 5,708,366 A | | 1/1998 | Nelson |
| 5,736,652 A | | 4/1998 | Strubbe |
| 5,957,773 A | | 9/1999 | Olmsted et al. |
| 5,959,218 A | * | 9/1999 | Strubbe .............. A01D 41/1271 73/861.71 |
| 5,970,802 A | | 10/1999 | Strubbe |

(Continued)

FOREIGN PATENT DOCUMENTS

EP  1169905 A1  1/2002

OTHER PUBLICATIONS

AU Examination Report from AU Patent Office, Application No. 2018203614; dated May 3, 2019, 4 pages.

(Continued)

*Primary Examiner* — Eman A Alkafawi
(74) *Attorney, Agent, or Firm* — Thomas J. Oppold; Larkin Hoffman Daly & Lindgren, Ltd.

(57) ABSTRACT

Apparatus, systems and methods are provided for monitoring yield while harvesting grain.

20 Claims, 27 Drawing Sheets

(56) References Cited

U.S. PATENT DOCUMENTS

| | | |
|---|---|---|
| 6,185,990 B1 | 2/2001 | Missotten et al. |
| 6,192,664 B1 | 2/2001 | Missotten et al. |
| 6,751,515 B2 | 6/2004 | Moore |
| 6,820,459 B2 | 11/2004 | Beck et al. |
| 6,899,616 B1 | 5/2005 | Murray et al. |
| 6,983,217 B2 | 1/2006 | Murray |
| 7,089,117 B2 | 8/2006 | Maertens |
| 7,257,503 B1 | 8/2007 | Anderson et al. |
| 7,728,720 B2 | 6/2010 | Anderson |
| 2003/0150283 A1 | 8/2003 | Stanley et al. |
| 2004/0002368 A1 | 1/2004 | Shinners et al. |
| 2005/0003875 A1 | 1/2005 | Beck et al. |

OTHER PUBLICATIONS

J. & M. Mfg Co., Inc., "Patented Single Auger Grain Carts" Operator's Manual. Ft. Recovery, Ohio; Feb. 11, 2019, 29 pages.

* cited by examiner

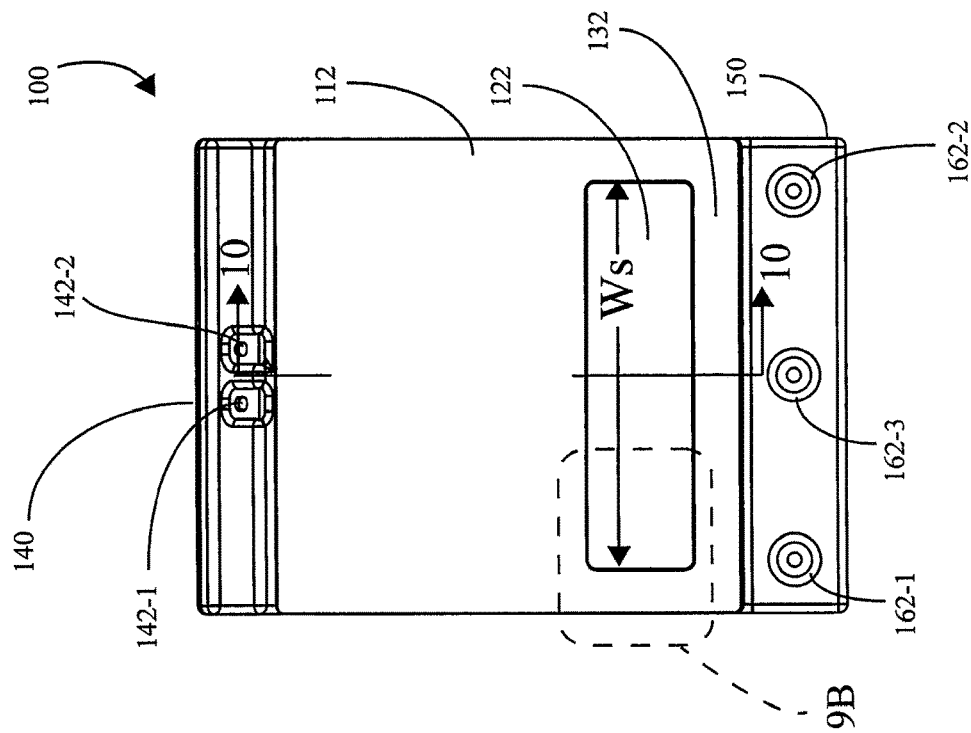
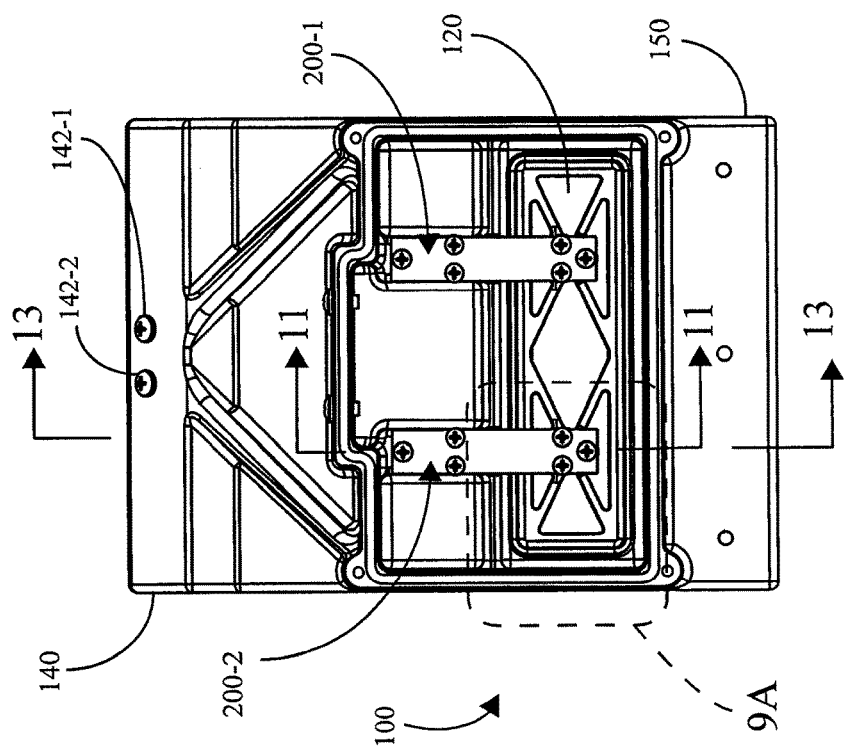
FIG. 8B
FIG. 8A

YIELD MONITORING APPARATUS, SYSTEMS AND METHODS

BACKGROUND

Live or real-time yield monitoring during crop harvesting is known in the art. One type of commercially available yield monitor uses an impact-type mass flow sensor such as that disclosed in U.S. Pat. No. 5,343,761, which is hereby incorporated herein in its entirety by reference. Although such monitors are generally capable of indicating the relative rate of mass flow in the combine during harvesting, they are known to be substantially inaccurate. As the interest and market investment in site-specific farming practices (e.g., variable rate planting and crop input applications) has increased, the need for accurate yield measurements (e.g., to generate accurate spatial yield maps by associating yield measurements with GPS-tracked locations) has become more significant.

As such, there is a need for apparatus, systems and methods of accurately measuring mass flow rate of grain while harvesting.

BRIEF DESCRIPTION OF THE DRAWINGS

FIG. 8A is a top view of the yield sensor assembly of FIG. 5.

FIG. 8B is a bottom view of the yield sensor assembly of FIG. 5.

DESCRIPTION

Conventional Combine and Yield Sensor

Figure 1:
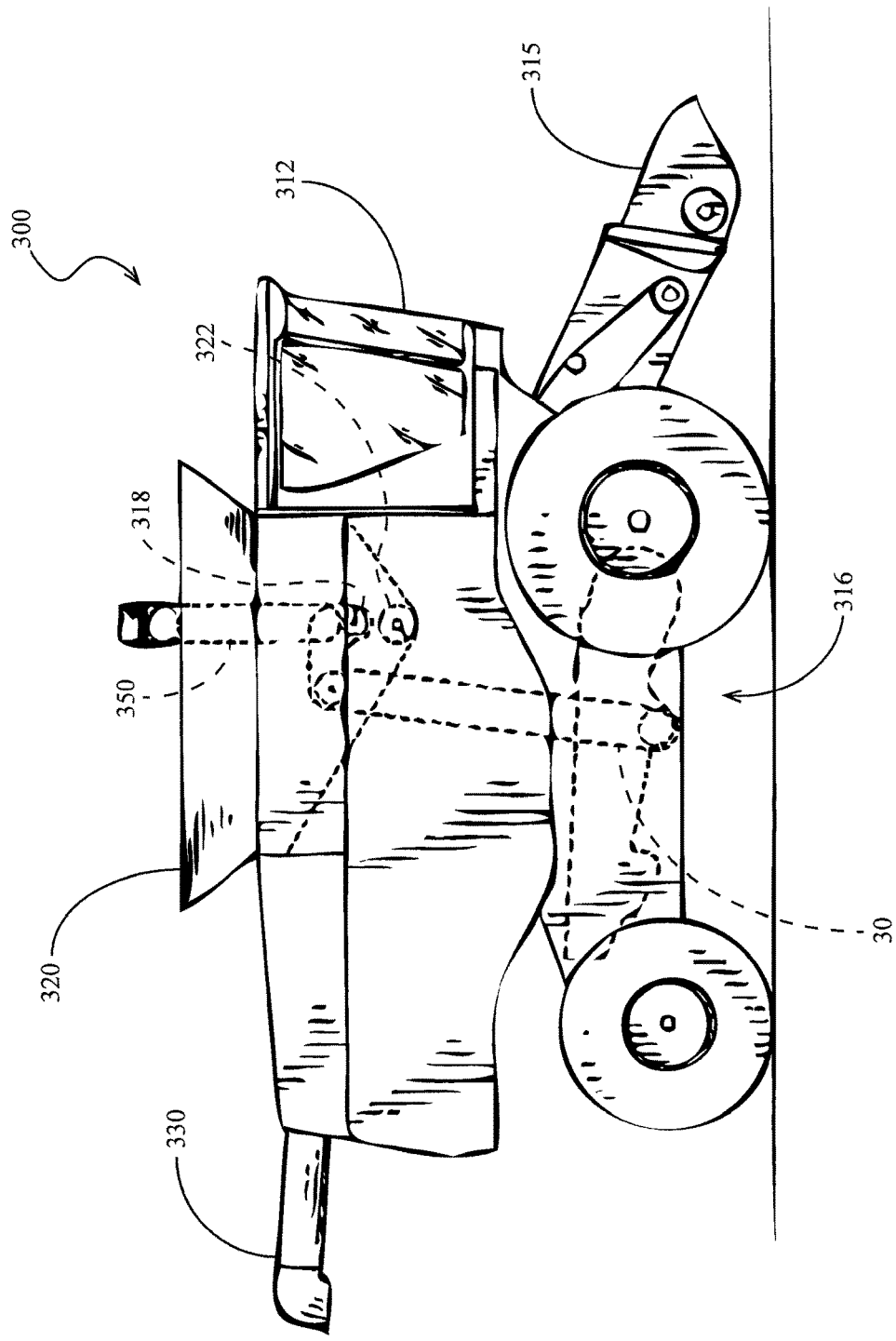
FIG. 1 is a side elevation view of a conventional combine.

Referring now to the drawings, wherein like reference numerals designate identical or corresponding parts throughout the several views, FIG. 1 illustrates a conventional combine 300. In operation, as the operator in cab 312 drives the combine 300 through the field, the crop being harvested is drawn through the head 315 into the feeder house 316 where the grain is separated from the other harvested plant material. The separated grain is lifted by a clean grain elevator 30 before being discharged into a collection area 318. Grain is then lifted from the collection area 318 by a fountain auger 350 and is discharged into a storage container incorporated in the combine such as a grain tank 320. The grain is subsequently conveyed by a cross-auger 322 to an unloading auger 330, which discharges the grain into a grain cart, wagon, truck or other vehicle for transporting for further processing or storage.

Figure 2:
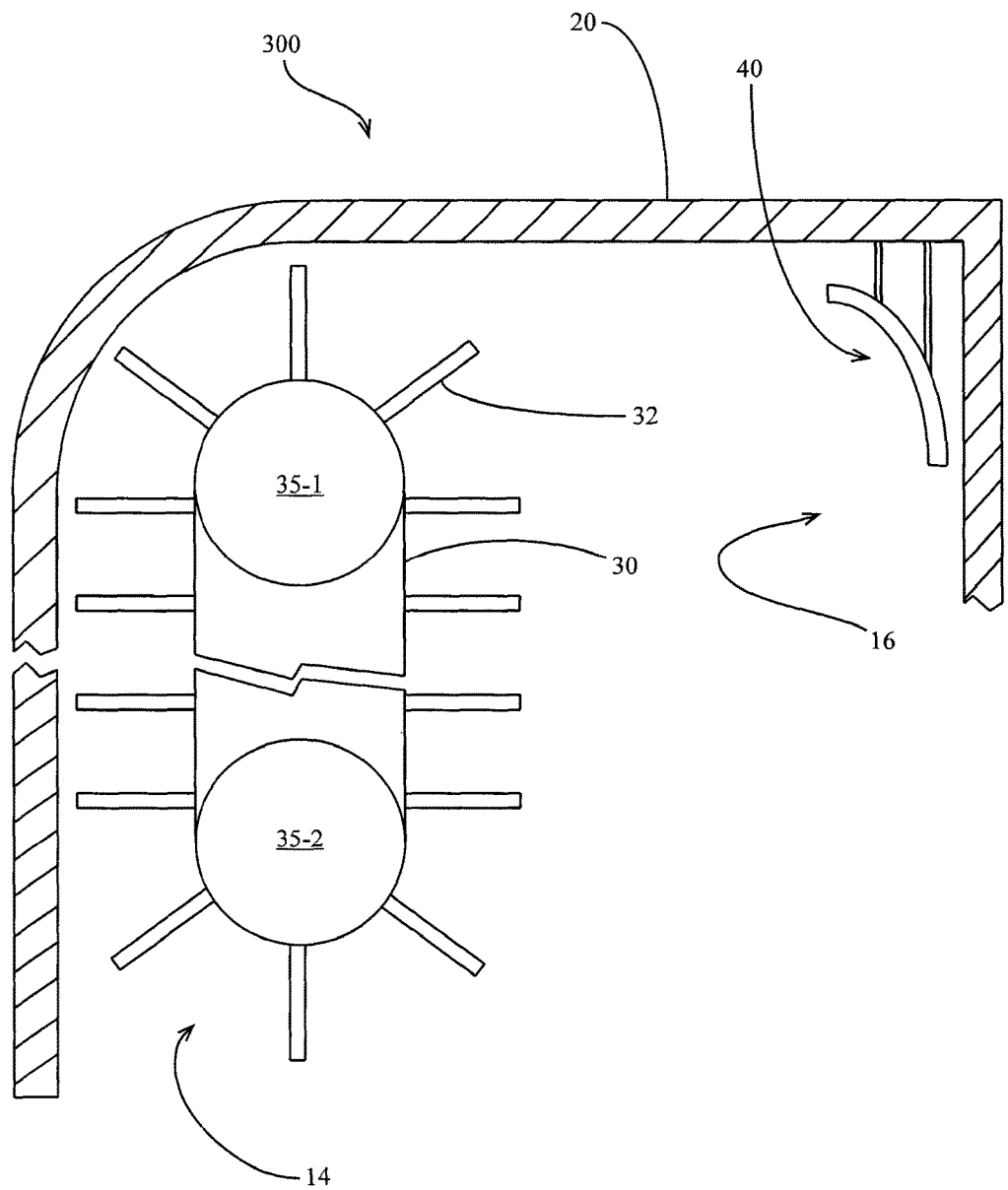
FIG. 2 illustrates a conventional clean grain elevator with a conventional impact-type yield paddle.

FIG. 2 schematically illustrates the clean grain elevator 30 within the elevator housing 20 of the combine 300. The elevator 30 is driven about an upper sprocket 35-1 and a lower sprocket 35-2. The elevator 30 includes flights 32 which collect grain from a lower area generally indicated by reference numeral 14. The flights 32 carry the grain up the height of the elevator 30. As the flights 32 rotate past upper sprocket 35-1, the grain is thrown toward the impact-type paddle 40 mounted within the elevator housing 20 in the area designated generally by reference numeral 16. The grain impacts the surface of the paddle 40 before falling into the collection area 318. The paddle 40 is generally instrumented (e.g., with strain gauges) to provide a signal related to the impact force of the grain. This signal is then transmitted to a yield monitor for processing where the impact force is correlated to the mass of the grain which is displayed to the operator, typically in bushels per acre.

Yield Sensor Apparatus, Manufacture and Installation

Figure 3:
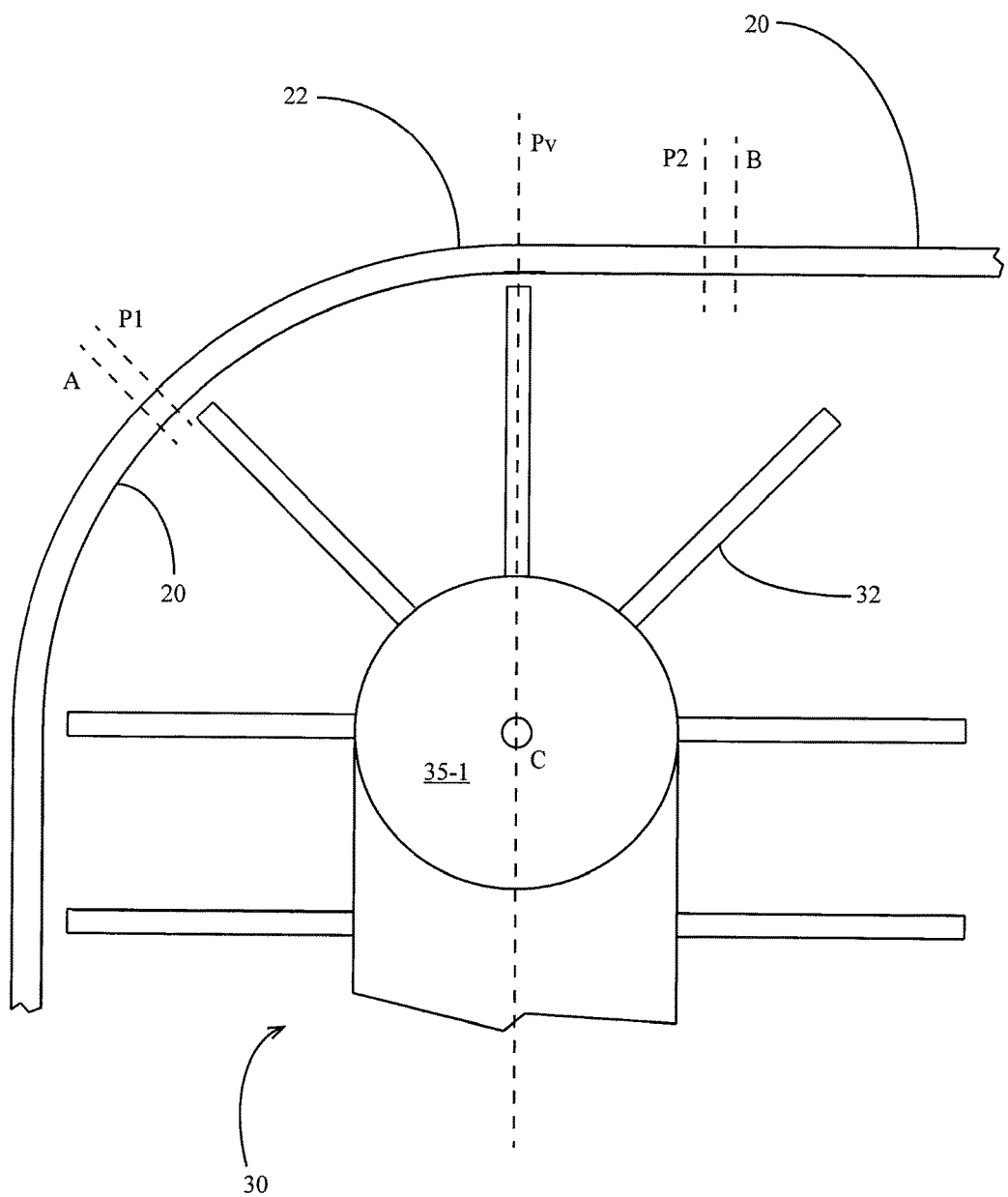
FIG. 3 is an enlarged view of the upper portion of the clean grain elevator of FIG. 2 illustrating preferred planes for removing a portion of the clean elevator housing and tapping holes in the elevator housing for installation of a yield sensor assembly.
Figure 4A:
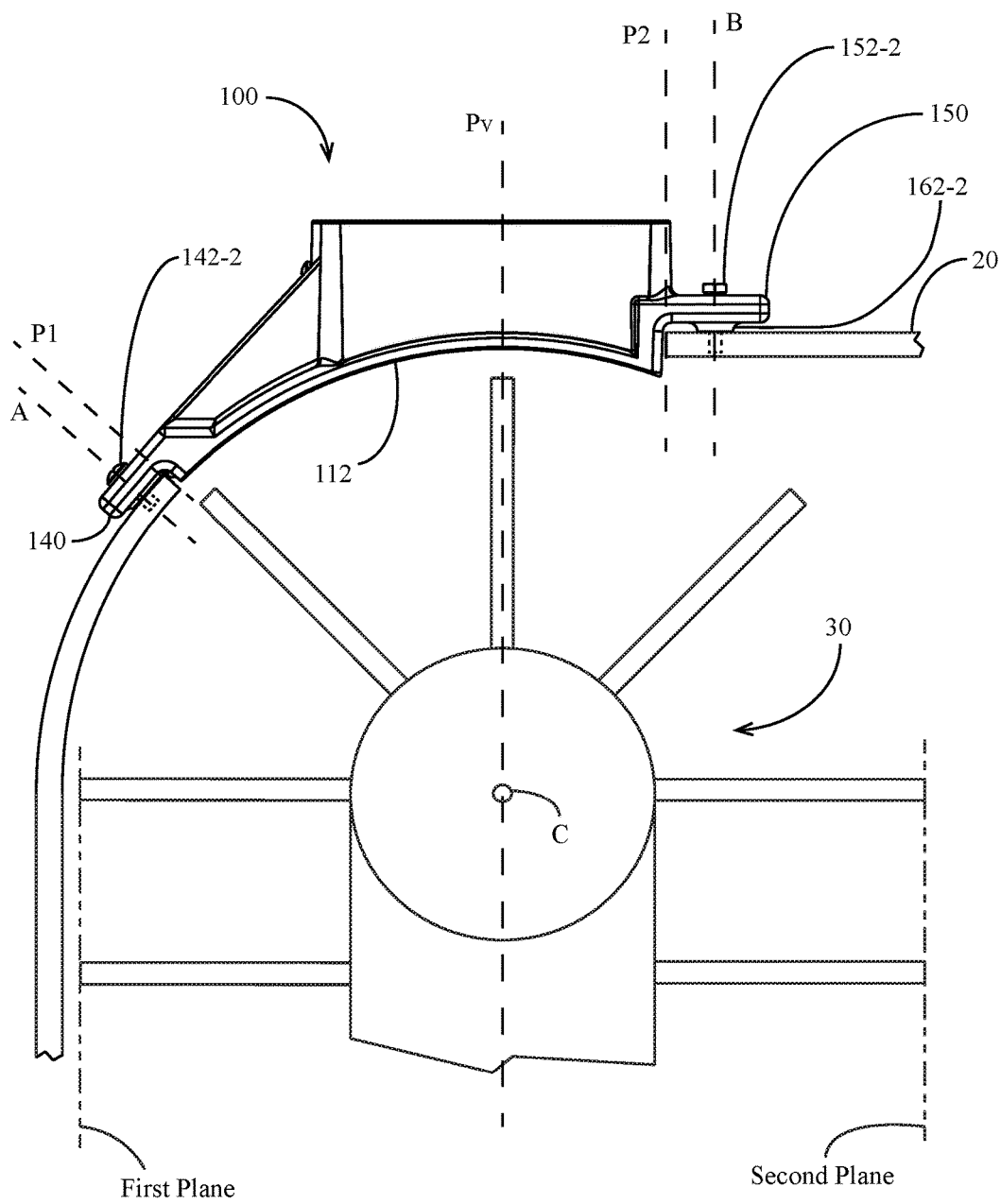
FIG. 4A illustrates the same portion of the clean grain elevator of FIG. 3 with one embodiment of the yield sensor assembly installed.
Figure 5:
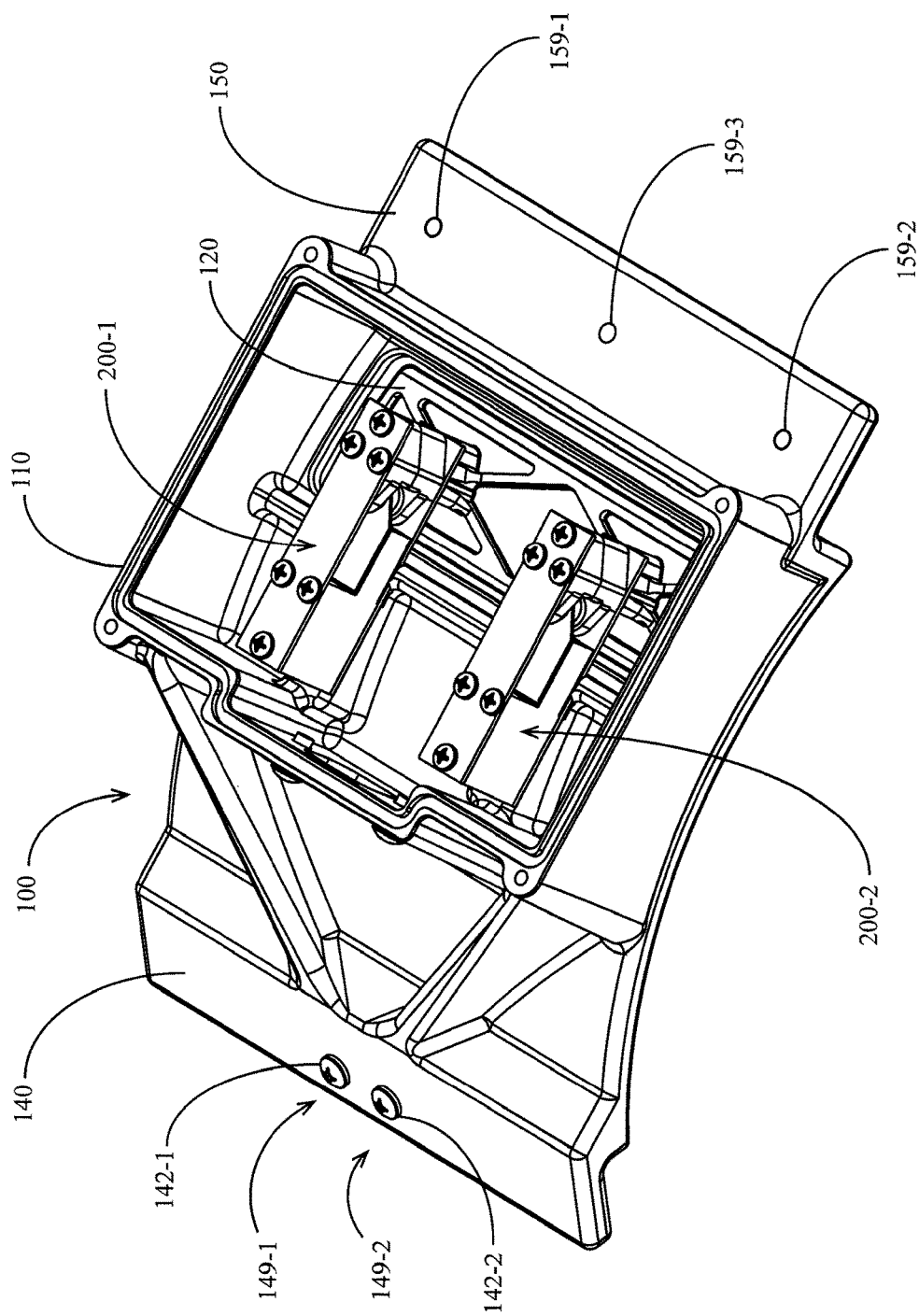
FIG. 5 is a top perspective view of the yield sensor assembly embodiment of FIG. 4A.
Figure 7A:
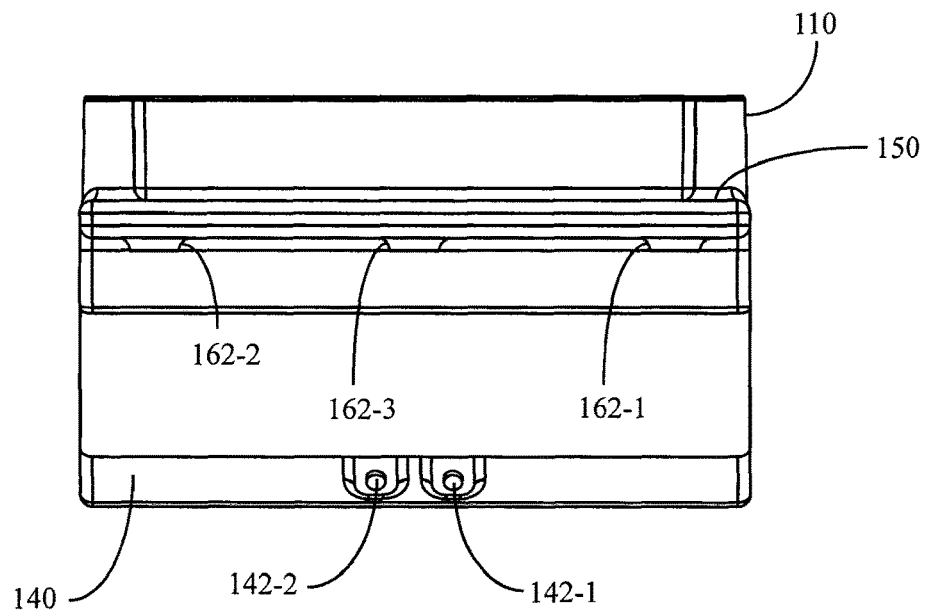
FIG. 7A is a front elevation view the yield sensor assembly of FIG. 5.
Figure 7B:
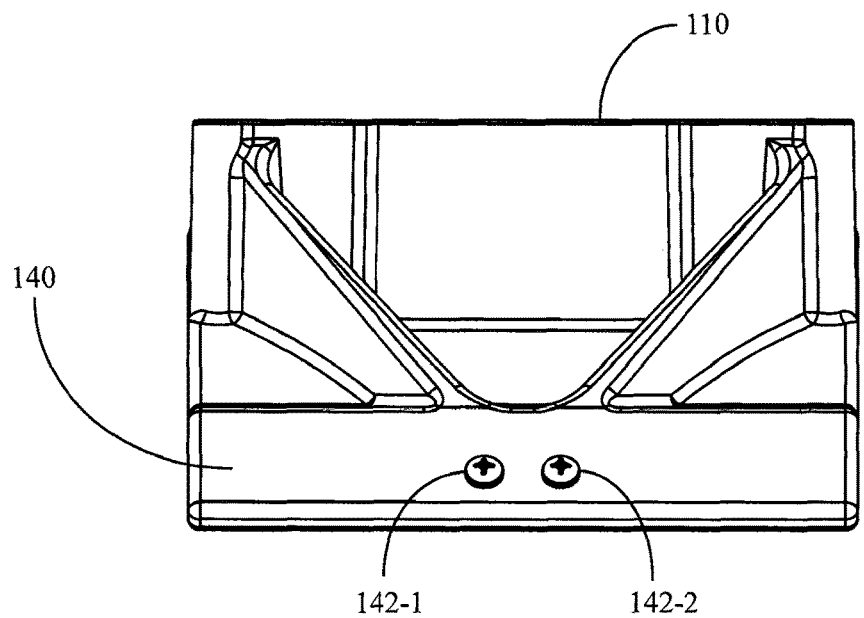
FIG. 7B is a rear elevation view of the yield sensor assembly of FIG. 5.

FIG. 5 is a perspective view of an embodiment of a yield sensor assembly 100, described in greater detail later. Turning to FIGS. 3 and 4A, the yield sensor assembly 100 is preferably installed at or near the top end of the clean grain elevator by removing a section of the elevator housing 20. As best illustrated in FIG. 3, a plane Pv runs through the center C of the upper sprocket 35-1 and through the center of the lower sprocket 35-2 (FIG. 2). The yield sensor assembly 100 includes a rearward attachment lip 140 extending rearward of a plane P1. The rearward attachment lip 140 preferably includes holes 149 (FIG. 5) aligned along a plane A for receiving screws 142. The yield sensor assembly 100 includes a forward attachment lip 150 extending forward of plane P2. The forward attachment lip 150 preferably includes holes 159 (FIG. 5) aligned along a plane B for receiving screws 152. Bosses 162 are preferably disposed below each hole in the forward attachment lip 150. The attachment lips 140,150 are further illustrated in FIGS. 7A and 7B, which illustrate the yield sensor assembly 100 from the front and rear, respectively.

Figure 17:
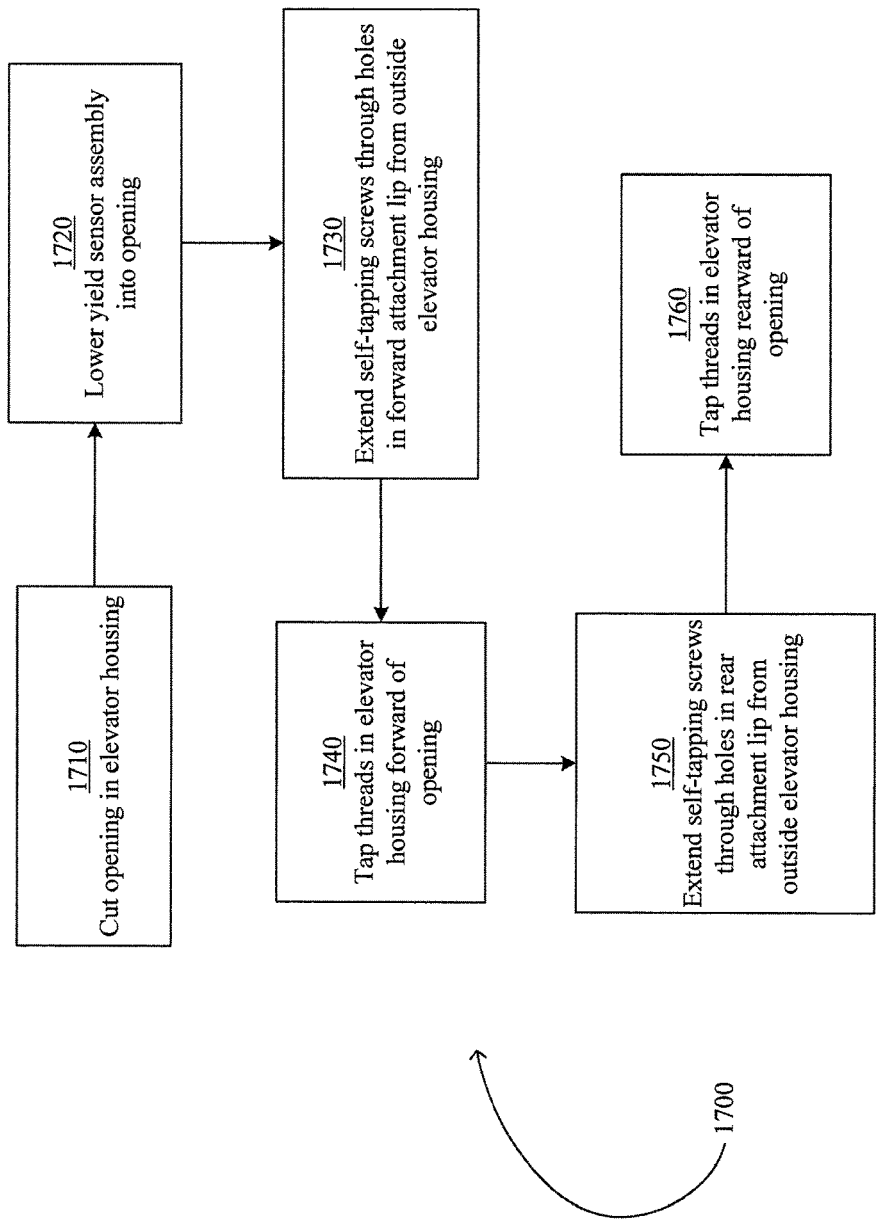
FIG. 17 illustrates an embodiment of a process for installing the yield sensor assembly of FIG. 5 to a clean grain elevator housing.

FIG. 17 illustrates a process designated generally by reference numeral 1700 for installing the yield sensor assembly 100. At step 1710, the operator preferably cuts an opening in the elevator housing 20 (e.g., using an acetylene torch) extending between two planes P2 and P1 (FIG. 3) extending through the elevator housing forward and rearward, respectively, of the plane Pv. The opening preferably has a width (into the page on the view of FIG. 3) sized to receive the yield sensor assembly 100. The operator then removes the portion 22 (FIG. 3) of the housing 20 within the opening. At step 1720, the operator preferably lowers the yield sensor assembly 100 into the opening. At step 1730, the operator preferably guides the screws 152 through the holes in the forward attachment lip 150. The screws 152 are preferably self-tapping. At step 1740, the operator preferably drives the screws 152 into the elevator housing 20, thus securing forward attachment lip to 150 the elevator housing. At step 1750, the operator preferably guides the screws 142 through the holes in the rearward attachment lip 140. The screws 142 are also preferably self-tapping. At step 1760 the operator preferably drives the screws 142 into the elevator housing 20, thus securing rearward attachment lip 140 to the elevator housing. It should be appreciated that the steps of process 1700 may be accomplished from outside the elevator housing 20, such that the operator is not required to disassemble the elevator housing to install the yield sensor assembly 100.

It should be appreciated that installation of the yield sensor assembly 100 may be performed by modified processes. For example, other embodiments of the elevator housing 20 are preferably manufactured with an opening for receiving the yield sensor assembly 100 such that cutting an opening in the elevator housing is unnecessary.

Figure 6:
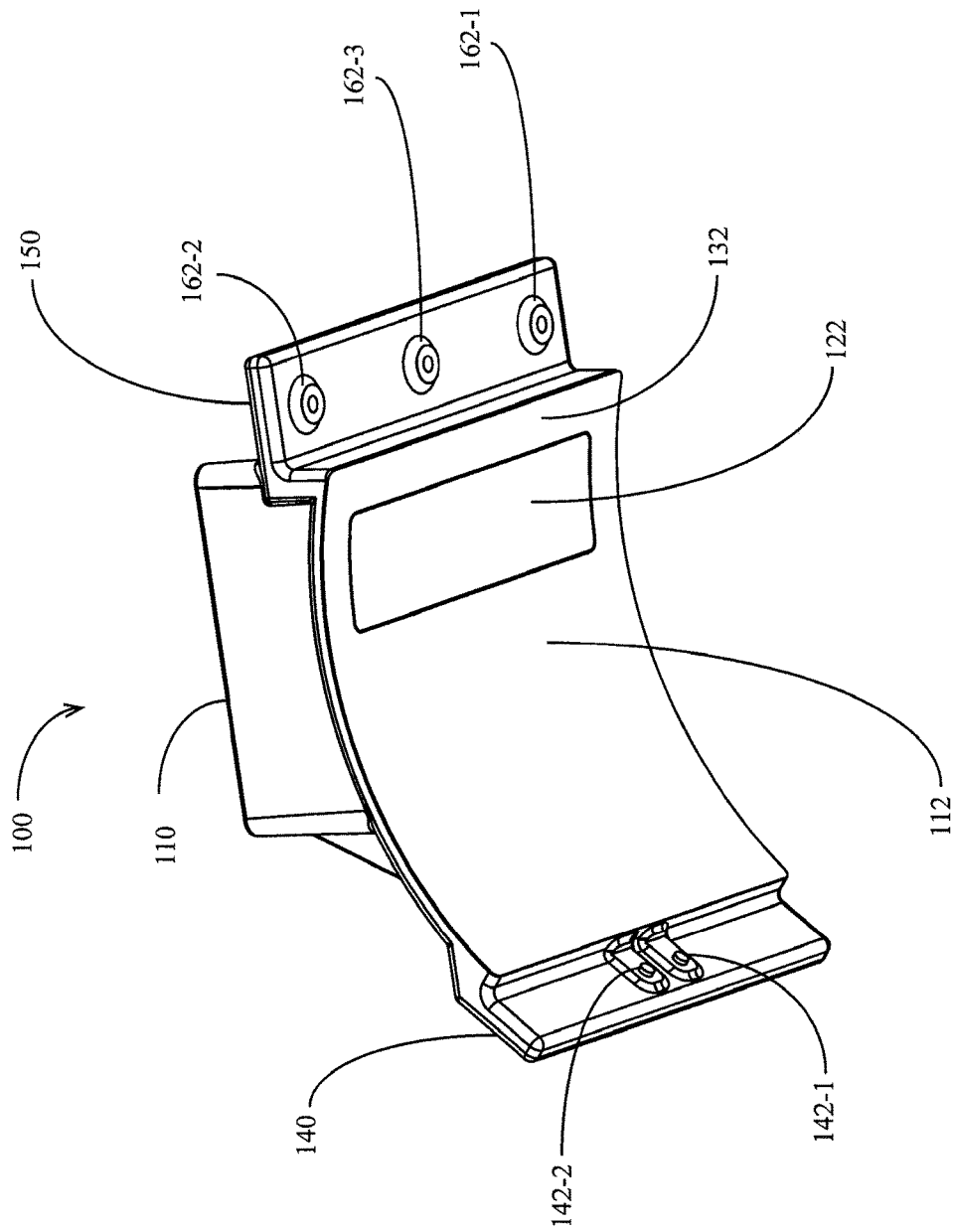
FIG. 6 is a bottom perspective view of the yield sensor assembly of FIG. 5.

Turning to FIG. 5, the yield sensor assembly 100 is illustrated from a top perspective view. The yield sensor assembly 100 includes a sensor housing 110. The yield sensor assembly 100 preferably includes left and right sensors 200-1, 200-2, respectively. A lid (not shown) is preferably removably mounted to the sensor housing 110 at an upper end thereof for protection of the sensors 200. The sensors 200 are mounted to the sensor housing 110. The sensors 200 are mounted at a forward end to a sensor plate 120. Referring to FIG. 6, which illustrates a bottom perspective view of the yield sensor assembly 100, the sensor plate 120 has a sensor surface 122. The sensor surface 122 is disposed between a pre-sensor surface 112 and a post-sensor surface 132. The pre-sensor surface 112 and the post-sensor surface 132 comprise lower surfaces of the sensor housing 110. Referring to FIG. 8B, a width Ws of the sensor surface 122 is preferably approximately half the width of the elevator flights 32.

Figure 13:
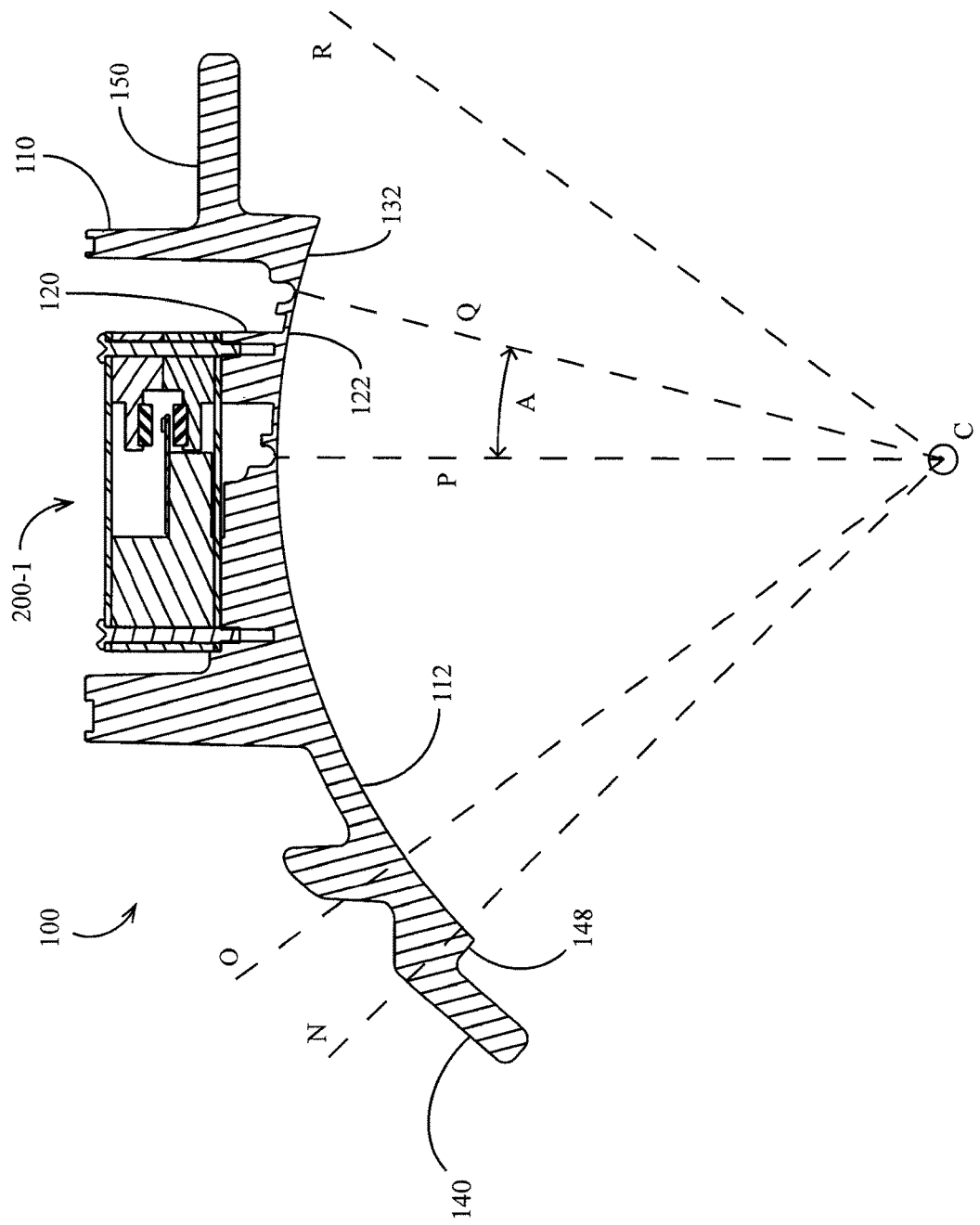
FIG. 13 is a cross-sectional view of the yield sensor assembly along lines 13-13 of FIG. 8A.

Referring to FIG. 13, the surfaces 112, 122, 132 are preferably concentric about the center C of the upper sprocket 35-1. The surfaces 112, 122, 132 preferably have equal radii of curvature. Planes P and Q intersect the center of the upper sprocket 35-1 and a forward end 121 and a rearward end 123 (FIG. 14A), respectively, of the sensor surface 122. Plane P is preferably approximately co-planar with the elevator plane Pv (FIG. 3) such that a forward end 121 (FIG. 14A) of the sensor surface 122 is located proximate the elevator plane Pv. Elevator plane Pv preferably intersects the sensor surface 122. Planes P and Q define an angle A. The angle A is preferably small enough that both the forward end 121 and the rearward end 123 of the surface 122 are proximate the elevator plane Pv. The angle A is preferably smaller than the maximum radial measurement (measured about point C) of each contiguous grain pile 50 sliding along the sensor surface 122 (e.g., grain pile 50-4 in FIG. 4B) at operational flow rates (e.g., at a grain mass flow rate of 25 kilograms per second). The angle A is preferably 15 degrees.

Continuing to refer to FIG. 13, the surface 112 extends rearwardly to a transition plane 148 which is abutted to the elevator housing 20. It should be appreciated that the transition plane 148 is the location at which any grain that has been thrown from the flights 32 against the inside of the elevator housing 20 will experience a transition between contacting the inside of the elevator housing and contacting the pre-sensor surface 112. It should further be appreciated that the flow of grain against the surfaces may experience a disturbance if the grain encounters a gap between the transition plane 148 and the elevator housing 20 or if the pre-sensor surface 112 is not co-planar with the interior surface of the elevator housing. It should further be appreciated that such a disturbance is then progressively reduced as the grain continues to flow against the surface 112. Plane O represents an angular position counter-clockwise from which any such disturbance will be sufficiently reduced prior to plane P such that the disturbance has no significant impact on the signal generated by the sensors 200. Plane N represents a plane counterclockwise from which grain is not thrown against the interior surface of the elevator housing 20 (or the pre-sensor surface 112) at expected flow rates. The transition plane 148 is preferably counter-clockwise of plane O. The transition plane 148 is preferably counter-clockwise of plane N. The transition plane 148 is preferably counter-clockwise of plane O. The transition plane 148 is preferably 45 degrees counter-clockwise of the rearward end 123 (FIG. 14A) of the sensor surface 122.

Figure 16:
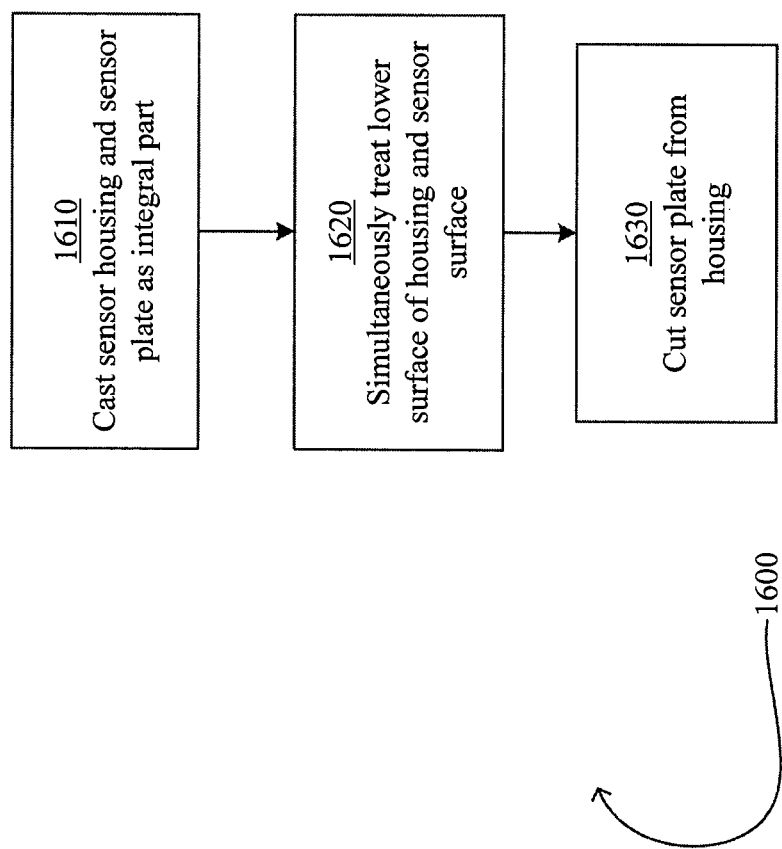
FIG. 16 illustrates an embodiment of a process for manufacturing the yield sensor housing of FIG. 5.

FIG. 16 illustrates a process designated generally by reference numeral 1600 for manufacturing the sensor housing 110 and the sensor plate 120. At step 1610, the sensor housing 110 and sensor plate 120 are preferably made of ductile cast iron as an integral casting. At step 1620, the lower surface of the integral casting is preferably treated to improve the material properties of the surface exposed to grain flow in operation. For example, a thermal spraying process such as tungsten carbide high velocity oxy-fuel (HVOF) coating is preferably applied to improve the resistance of the lower surface to wear resulting from grain flow. At step 1630, the sensor plate 120 is cut from the sensor housing 110. It should be appreciated in light of the instant disclosure that casting and treating the sensor plate 120 together with the sensor housing 110 results in similar wear properties of the surfaces 112, 122, 132 (FIG. 6).

Figure 9A:
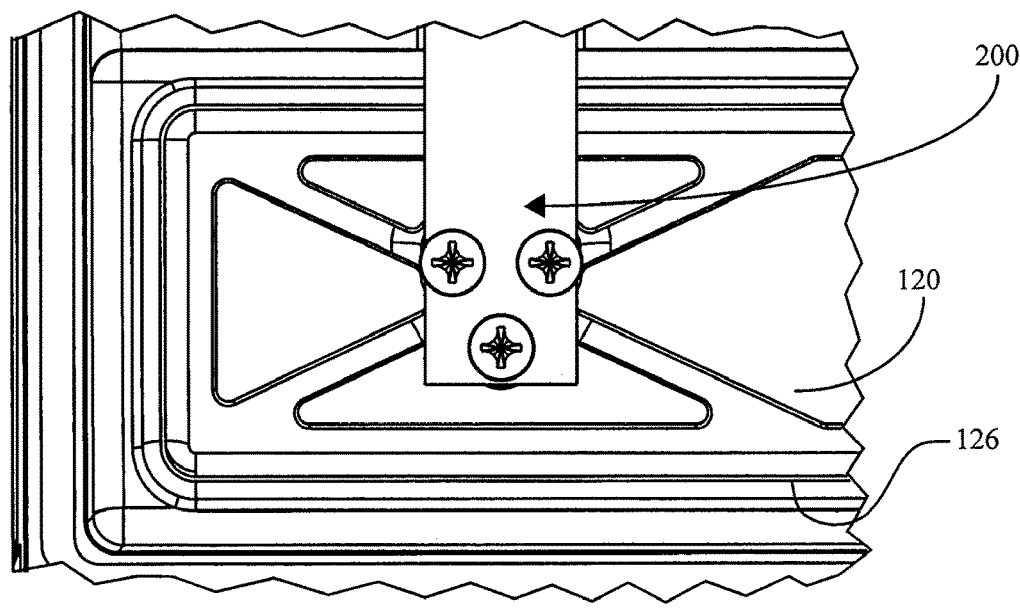
FIG. 9A is an enlarged partial top view of the yield sensor assembly of FIG. 5.
Figure 9B:
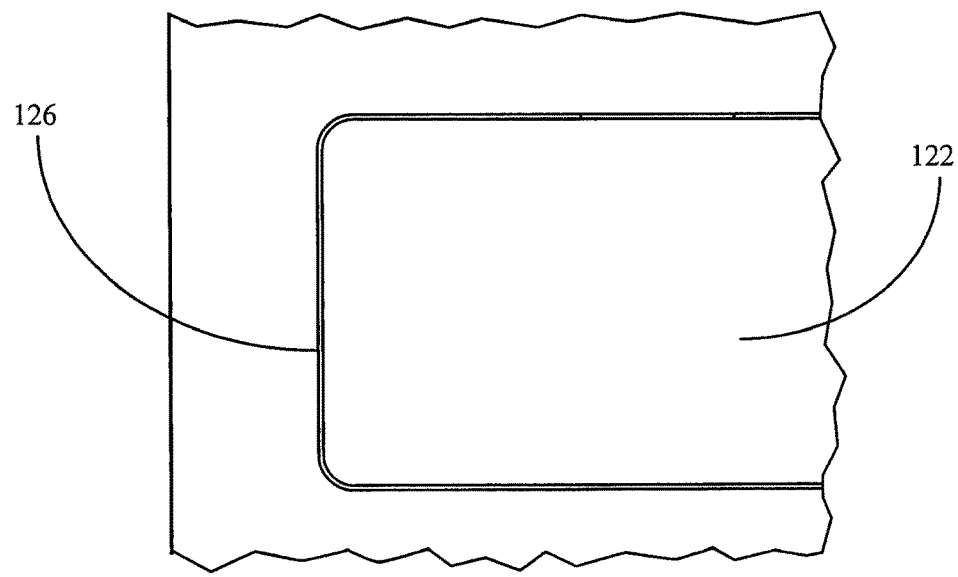
FIG. 9B is an enlarged partial bottom view of the yield sensor assembly of FIG. 5.

Referring to FIGS. 8A and 8B, the yield sensor assembly 100 is illustrated from top and bottom views, respectively. Turning to FIGS. 9A and 9B, the yield sensor assembly is likewise illustrated from top and bottom views, respectively, and enlarged to better illustrate a small gap 126 preferably disposed between the sensor plate 120 and the sensor housing 110. The gap 126 is preferably smaller than the minimum width of grain to be harvested (e.g. smaller than 5 hundredths of an inch) with the combine 300 such that grain is substantially excluded from entering the gap 126. Additionally, the gap 126 is preferably sealed with an elastic gel (not shown) such as a dielectric tough gel available from Dow Corning in Midland, Mich.

Sensor Apparatus

Figure 10:
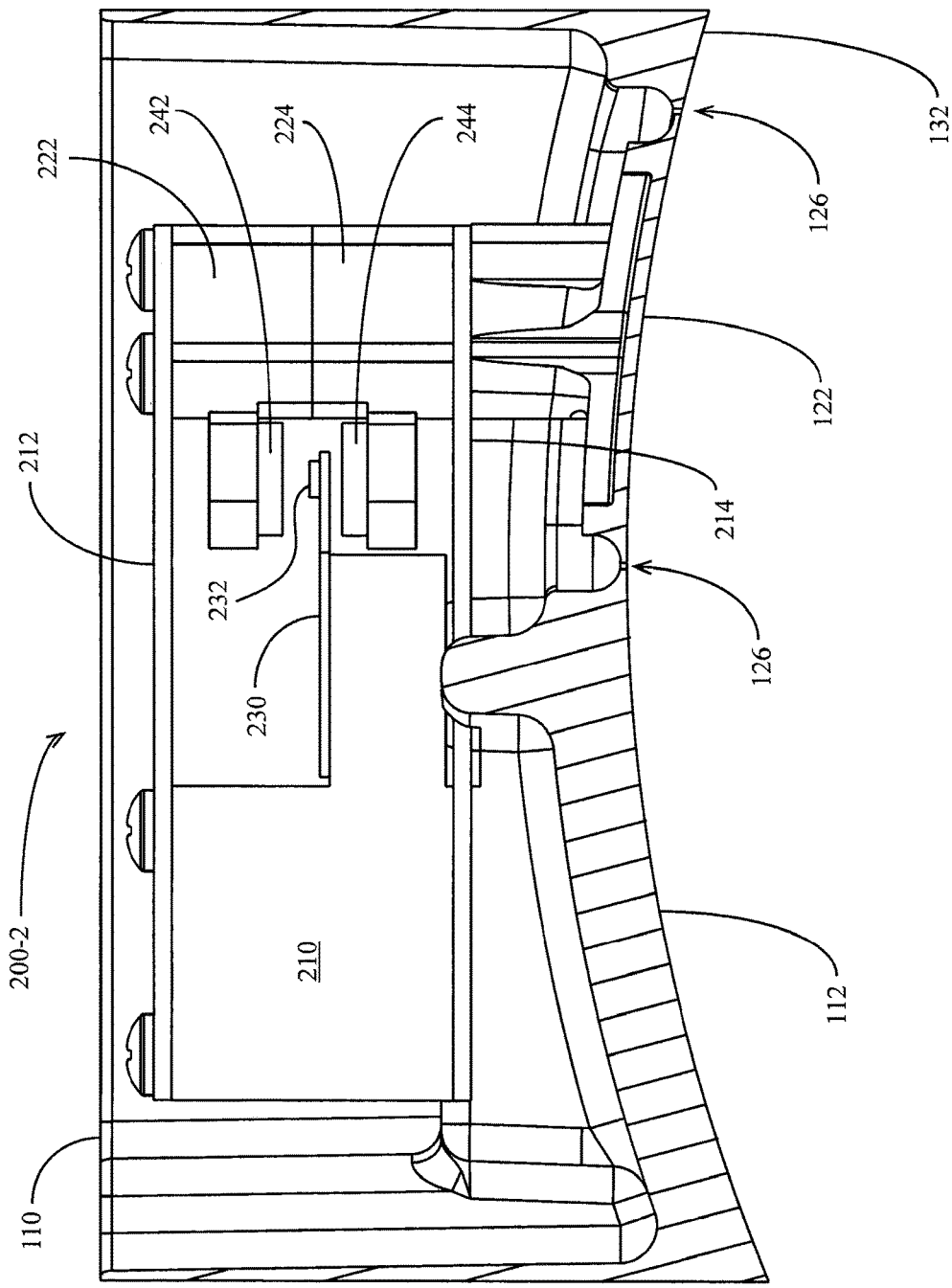
FIG. 10 is a partial cross-sectional view the yield sensor assembly as viewed along lines 10-10 of FIG. 8B.
Figure 11:
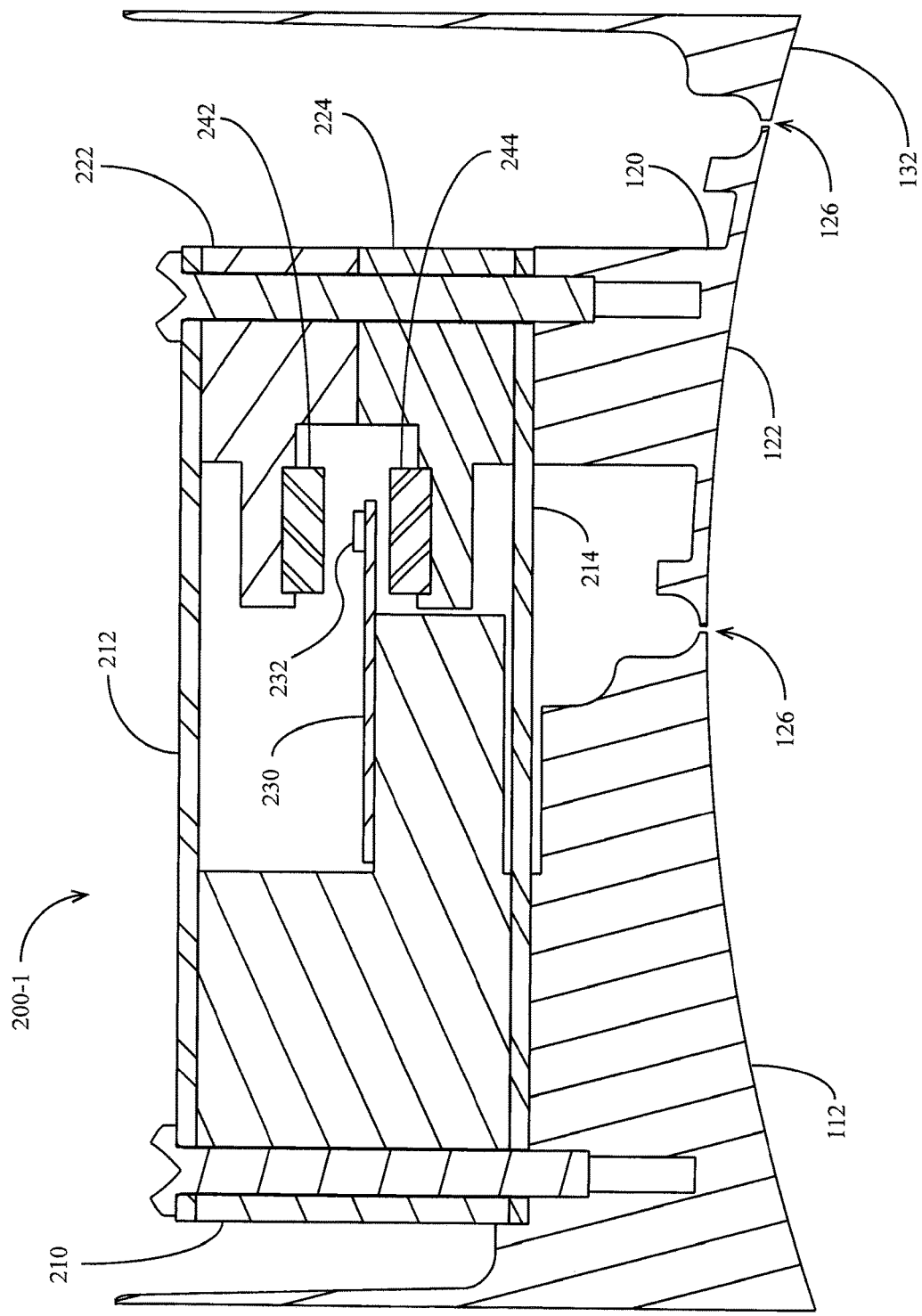
FIG. 11 is a partial cross-sectional view of the yield sensor assembly as viewed along lines 11-11 of FIG. 8A.
Figure 12:
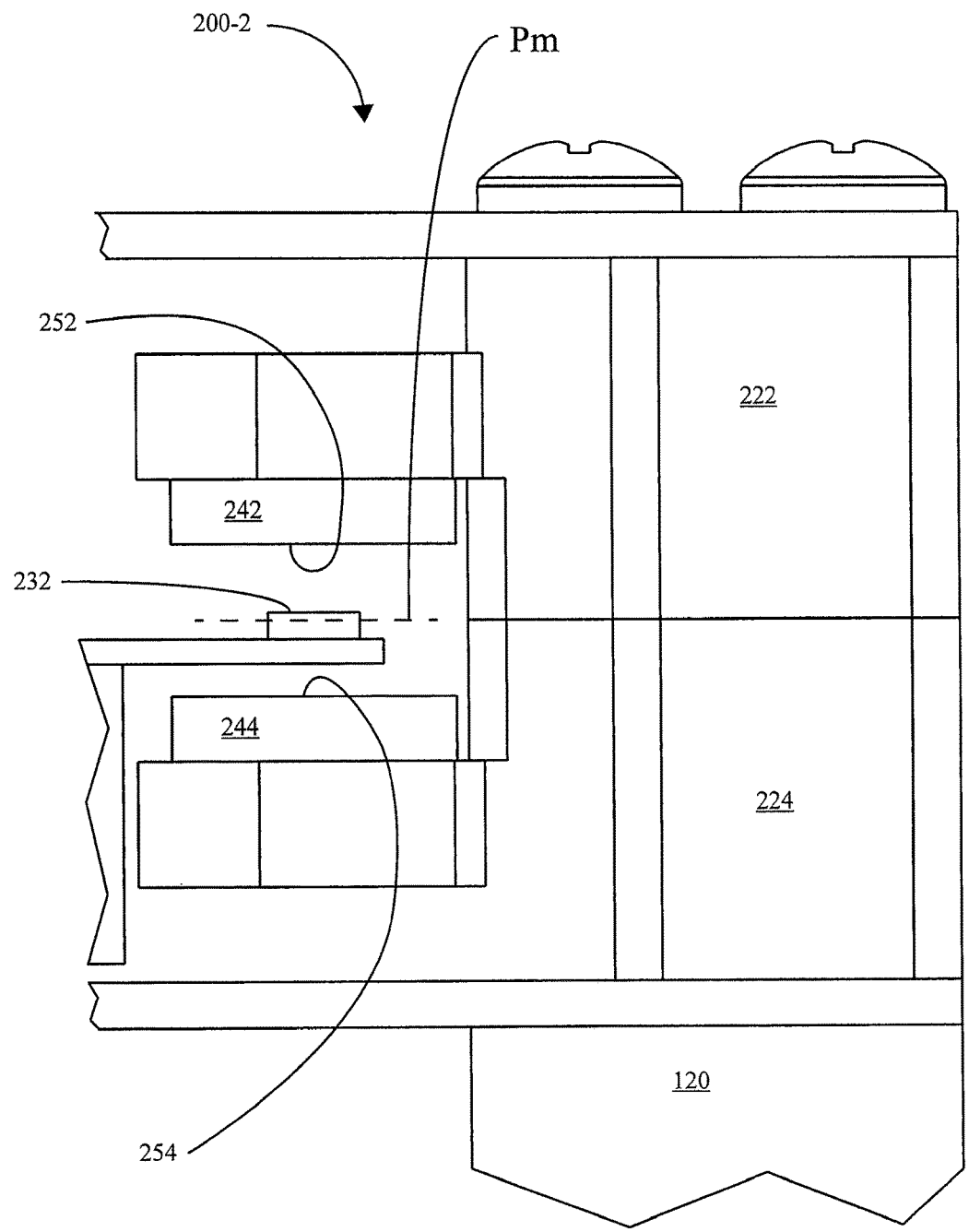
FIG. 12 is enlarged partial view of the circled areas in FIG. 11.

The sensors 200 are illustrated in detail in FIGS. 10-12. Referring to FIGS. 10 and 11, each sensor 200 preferably includes a board holder 210 mounted to the sensor housing 110. A printed circuit board 230 is preferably mounted to the board holder 210. The printed circuit board 230 preferably includes a Hall-effect sensor 232 in electrical communication with processing circuitry for receiving a signal from the Hall-effect sensor. In other embodiments, the Hall-effect sensor 232 is replaced with other types of displacement sensors as are known in the art. An upper spring 212 is preferably mounted at a rearward end to the board holder 210. A lower spring 214 is preferably mounted at a rearward end to the board holder 210. The upper spring 212 is preferably mounted at a forward end to an upper magnet holder 222. The lower spring 214 is preferably mounted at a forward end to a lower magnet holder 224. The spring 212 and the spring 214 are preferably substantially parallel. It should be appreciated that the springs 212, 214 comprise a parallel support arm arrangement for supporting the sensor plate 120. The springs 212 of each sensor 200 are preferably substantially co-planar. Likewise, the springs 214 of each sensor 200 are preferably substantially co-planar. An upper magnet 242 is preferably mounted to the upper magnet holder 222. A lower magnet 244 is preferably mounted to the lower magnet holder 224. As best illustrated in FIG. 11, the springs 212, 214 and the board holder 210 are preferably mounted to the sensor housing 110 by screws threaded into the sensor housing. The springs 212, 214 and the magnet holders 222, 224 are preferably mounted to the sensor plate 120 by screws threaded into the sensor plate.

As illustrated in FIG. 12, the magnets 242, 244 have like poles 252, 254, respectively, which preferably face each other. The magnets 242, 244 preferably have substantially equivalent size and strength such that the magnetic field is approximately zero along a plane Pm equidistant from the magnets 242, 244. The plane Pm preferably intersects the Hall-effect sensor 232 when the sensor plate 120 is not being deflected upward by grain flow.

Operation

Figure 4B:
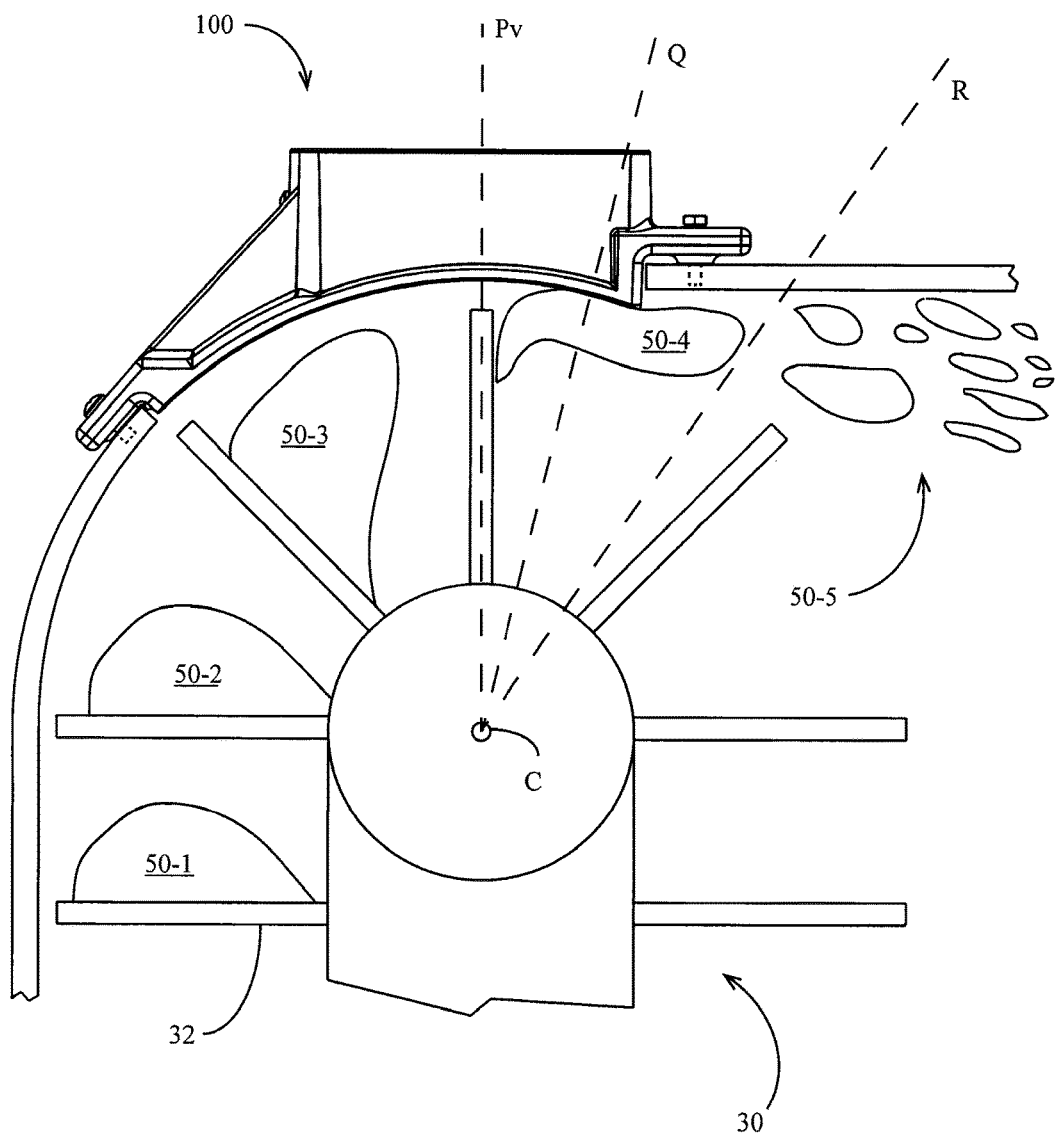
FIG. 4B illustrates the grain as it is being thrown from the elevator flights against the yield sensor assembly of FIG. 4A.

In operation, as best illustrated in FIG. 4B, the clean grain elevator 30 collects individual grain piles 50 near a lower end and throws the grain piles forward. As the grain piles 50 travel around the top of the conveyor, they travel radially outward from the upper sprocket 35-1 and slide along yield sensor assembly 100.

FIG. 4B further illustrates the approximate shape of the grain piles 50 at several stages as the grain piles are carried around the upper end of the elevator 30. Grain piles 50-1 and 50-2 rest on the flights 32. Grain pile 50-3 has begun to travel around the top of the elevator 30 and has been partially deformed in a radially outward fashion by centrifugal acceleration.

In a region clockwise from plane Pv, grain piles such as grain pile 50-4 have been further deformed and translated such that they have been released from the flight 32 and slide along the yield sensor assembly 100. Thus the forward end 121 (FIG. 14A) of sensor surface 122 is preferably located proximate elevator plane Pv.

In a region angularly clockwise from a plane R intersecting the center C of the sprocket 35-1, grain pile 50-5 begins to lose its contiguous shape as the grain is scattered. Thus (as best seen in FIG. 13) the plane Q denoting the forward end 121 (FIG. 14A) of the sensor surface 122 is preferably counterclockwise of the plane R such that the grain passing along the sensor surface 122 has a contiguous shape.

Figure 14A:
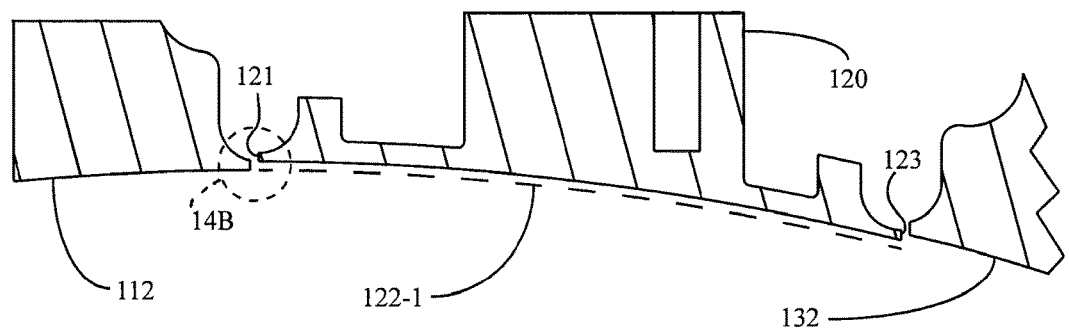
FIG. 14A is an enlarged view of the circled area of FIG. 13, illustrating deflection of the sensor plate.
Figure 14B:
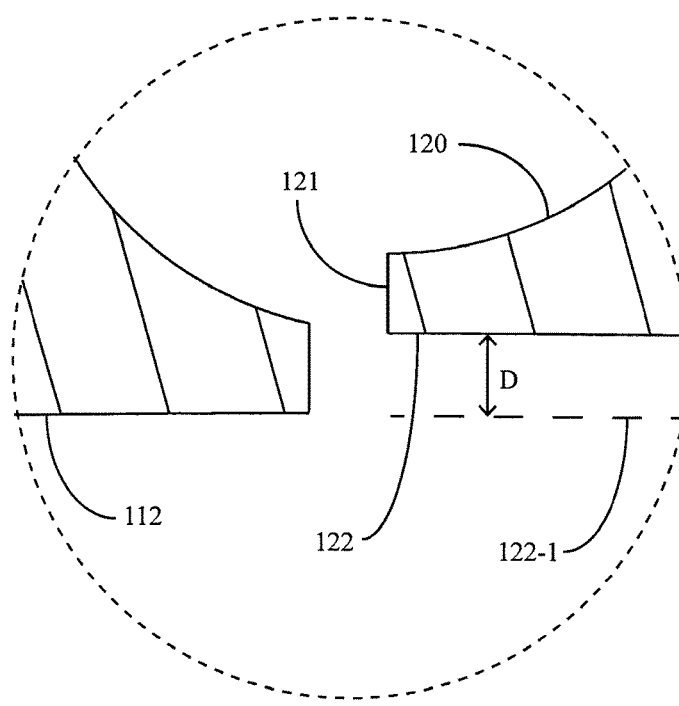
FIG. 14B is an enlarged view of the circled area of FIG. 14A.

It should be appreciated that the flow of grain across surfaces 112, 122, 132 exerts radially outward forces against those surfaces. The surfaces 112,132 are substantially undeflected by these forces. However, as best illustrated in FIG. 14A, which is an enlarged view of the circled area of FIGS. 13, and 14B, which is an enlarged view of the circled area of FIG. 14A, surface 122 is deflected slightly upward by a distance D from an undeflected position (indicated by reference numeral 122-1) and its deflected position. It should also be appreciated that the deflection of surface 122 results from translation of the entire sensor plate 120, because the sensor plate preferably comprises a solid steel casting, the surface 122 is sufficiently tough and hard that the surface 122 itself is not substantially deformed by contact with passing grain. Moreover, due to the parallel arrangement of 212, 214, the deflection of surface 122 is preferably substantially by simple translation (i.e., substantially without rotation) such that each point along the surface 122 is deflected upward by substantially the same distance. The maximum deflection D of the paddle (i.e., the deflection at maximum grain flow rate) is preferably less than 10 hundredths of an inch. The maximum deflection D of the paddle is preferably less than 10 thousandths of an inch. The maximum deflection D of the paddle is preferably approximately 5 thousandths of an inch. It should be appreciated that the illustrated deflection D is exaggerated in FIGS. 14A and 14B for illustrative purposes. Additionally, the undeflected position of the forward end 121 of surface 122 is preferably higher than a rearward end of the surface 112 by a very small distance (e.g., less than 10 thousandths of an inch) to ensure that grain does not encounter a horizontal surface when moving from the rearward end of the surface 112 to the sensor surface 122. Similarly, as illustrated in FIG. 14A, the fully deflected position of the rearward end 123 of surface 122 is preferably lower than the forward end of the surface 132 by a very small distance (e.g., less than 10 thousandths of an inch) to ensure that grain does not encounter a horizontal surface when moving from the rearward end 123 of the surface 122 to the sensor surface 132 even when the surface 122 is fully deflected upward. It should be appreciated that the position of surface 132 relative to surface 122 is exaggerated in FIG. 14A for illustrative purposes.

Due to the preferably small size of gap 126 (FIG. 11), the preferably small upward offset of surface 122 relative to surface 112 in both deflected and undeflected positions of the surface 122 (FIG. 14A), the preferably small deflection of the surface 122 in operation, and the preferably common curvature of surfaces 112 and 122 (best seen in FIG. 13), the surfaces 112 and 122 preferably comprise a nearly continuous surface and preferably allow substantially continuous grain flow across both surfaces during operation. Similarly, due to the preferably small size of gap 126 (FIG. 11), the preferably small upward offset of surface 132 relative to surface 122 in both deflected and undeflected positions of the surface 122 (FIG. 14A), the preferably small deflection of the surface 122 in operation, and the preferably common curvature of surfaces 122 and 132 (best seen in FIG. 13), the surfaces 122 and 132 preferably comprise a nearly continuous surface and preferably allow substantially continuous grain flow across both surfaces during operation. Thus it should be appreciated that the surfaces 112, 122 and 132 preferably comprise a nearly continuous surface and preferably allow substantially continuous grain flow across all three surfaces during operation.

Turning to FIG. 11, the upward deflection D is allowed by deformation of the springs 212,214 of the sensors 200. In order to permit only a very small maximum deflection D of the surface 122, the effective spring rate of the springs 212,214 is preferably approximately 20 pounds per two thousandths of an inch. The natural frequency of the yield sensor assembly 100 is preferably greater than ten times the maximum frequency at which grain piles 50 contact the sensor surface 112. The natural frequency of the yield sensor assembly 100 is preferably approximately 400 hertz.

Returning to FIG. 12, as the sensor plate 120 is deflected upward, the magnets 242,244 deflect upward such that the Hall-effect sensor 232 is exposed to a stronger magnetic field. Thus as the deflection of the sensor plate 120 increases, a signal generated by the Hall-effect sensor 232 increases. It should be appreciated that because the plane Pm representing zero magnetic field (as discussed elsewhere herein with respect to FIG. 12) intersects the Hall-effect sensor 232 in the undeflected state, the signal generated by the Hall-effect sensor 232 changes from near-zero to a non-zero value upon deflection of the sensor plate 120. This results in more clearly delineated pulses in the signal, making the signal more conducive to processing.

Yield Measurement Systems

Figure 15:
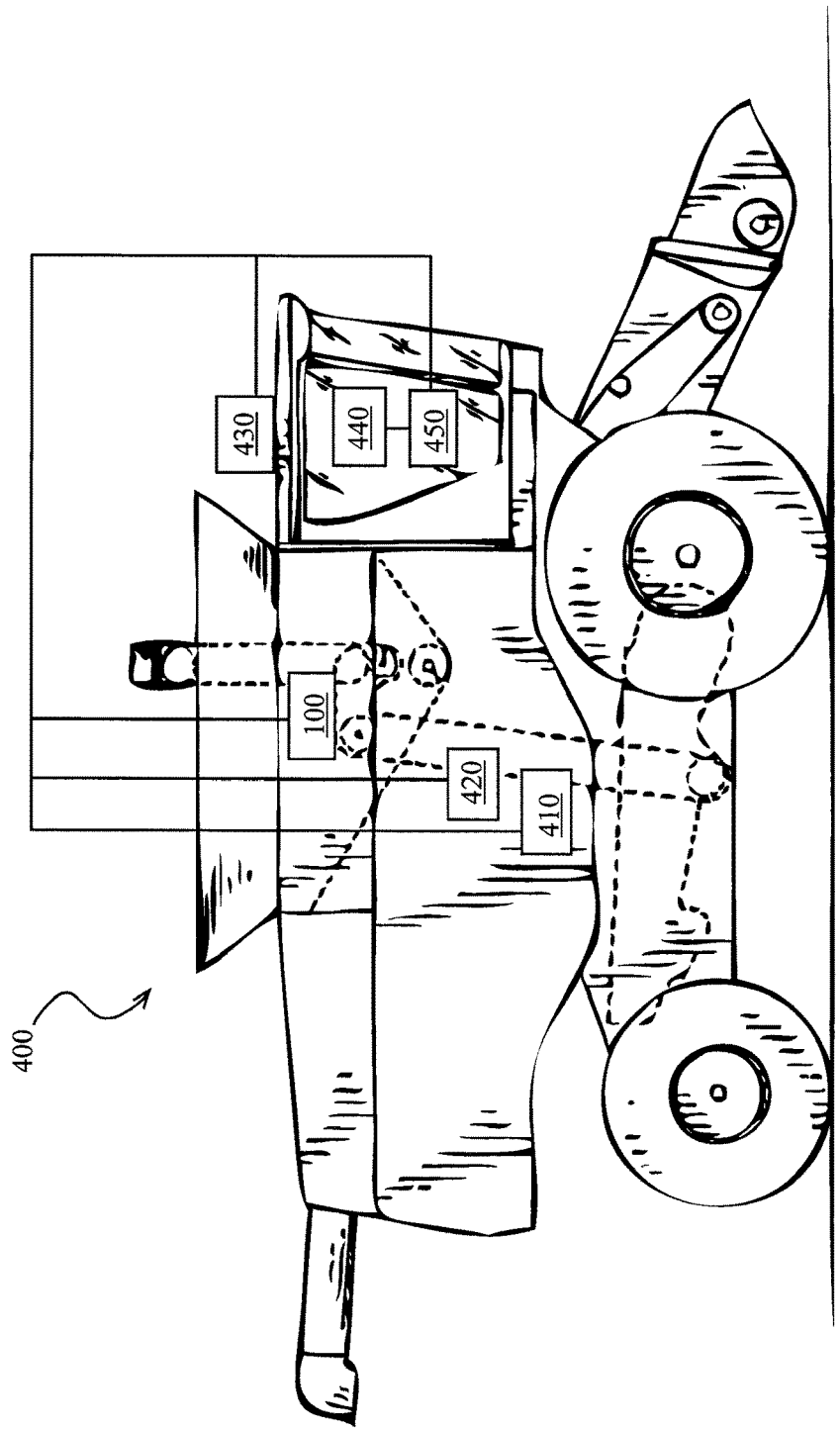
FIG. 15 schematically illustrates a yield monitoring system.

A yield measurement system 400 is schematically illustrated in FIG. 15 with respect to the combine 300. The yield measurement system 400 preferably includes a yield sensor assembly 100. As discussed elsewhere herein, the yield sensor assembly 100 is preferably mounted to the clean grain elevator housing above the clean grain elevator. The yield measurement system 400 preferably further includes a grain height sensor 410, a moisture sensor 420, a global positioning receiver 430, a graphical user interface 440, and a processing board 450.

Figure 18:
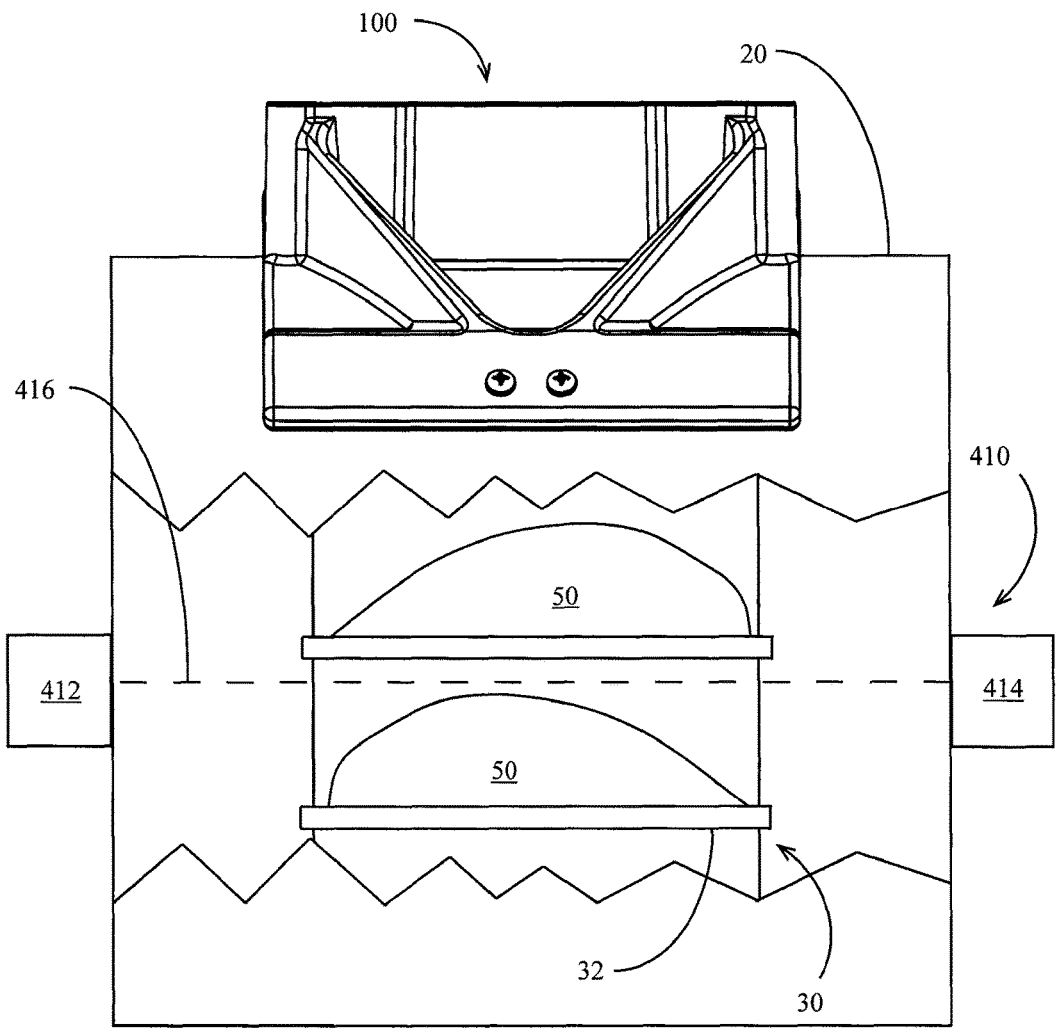
FIG. 18 is a rear cutaway view of a clean grain elevator housing incorporating an embodiment of the grain height sensor.

The grain height sensor 410 preferably comprises a sensor configured and disposed to measure the height of grain being lifted by the clean grain elevator. The grain height sensor 410 is preferably mounted to the sides of the clean grain elevator housing 20 adjacent the location where grain piles 50 are lifted vertically before reaching the top of the clean grain elevator 30. The grain height sensor is preferably disposed below the center C of upper sprocket 35-1 such that the measured grain piles 50 have not been deformed by turning of the flights 32 about the upper sprocket 35-1. In an embodiment as illustrated in FIG. 18, the grain height sensor 410 preferably comprises an optical transmitter 412 configured to emit a beam 416 toward a receiver 414 disposed opposite the passing grain piles 50. The receiver 414 is preferably in electrical communication with the processing board 450. In some embodiments, the grain height sensor 410 may comprise a commercially available grain height sensor such as that used in the 8000i Yield Monitor available from Loup Electronics in Lincoln, Nebr. It should be appreciated that the grain height sensor 410 is not required for operation of the yield monitoring system 400 or the yield sensor assembly 410.

The moisture sensor 420 preferably comprises a sensor disposed to measure the moisture of grain being lifted by the clean grain elevator 30. For example, in some embodiments, the moisture sensor 420 comprises a capacitive moisture sensor such as that disclosed in U.S. Pat. No. 6,285,198, the disclosure of which is incorporated by reference herein in its entirety. The moisture sensor 420 is preferably mounted to the side of the clean grain elevator housing 20 adjacent the location where grain piles 50 are lifted vertically before reaching the top of the clean grain elevator 30. The moisture sensor 420 is preferably in electrical communication with the processing board 450.

The global positioning receiver 430 preferably comprises a receiver configured to receive a signal from the global positioning system (GPS) or similar geographical referencing system. The global positioning receiver 430 is preferably mounted to the top of the combine 300. The global positioning receiver 430 is preferably in electrical communication with the processing board 450.

The processing board 450 preferably comprises a central processing unit (CPU) and a memory for processing and storing signals from the system components 410, 420, 100, 430 and transmitting data to the graphical user interface 440.

The graphical user interface 440 preferably comprises a central processing unit (CPU), a memory and interactive display interface operable to display yield measurements and yield maps to the operator and to accept instructions and data from the operator. The graphical user interface 440 is preferably mounted inside the cab 312 of the combine 300. The graphical user interface 440 is preferably in electrical communication with the processing board 450.

Yield Mapping Methods

Figure 19:
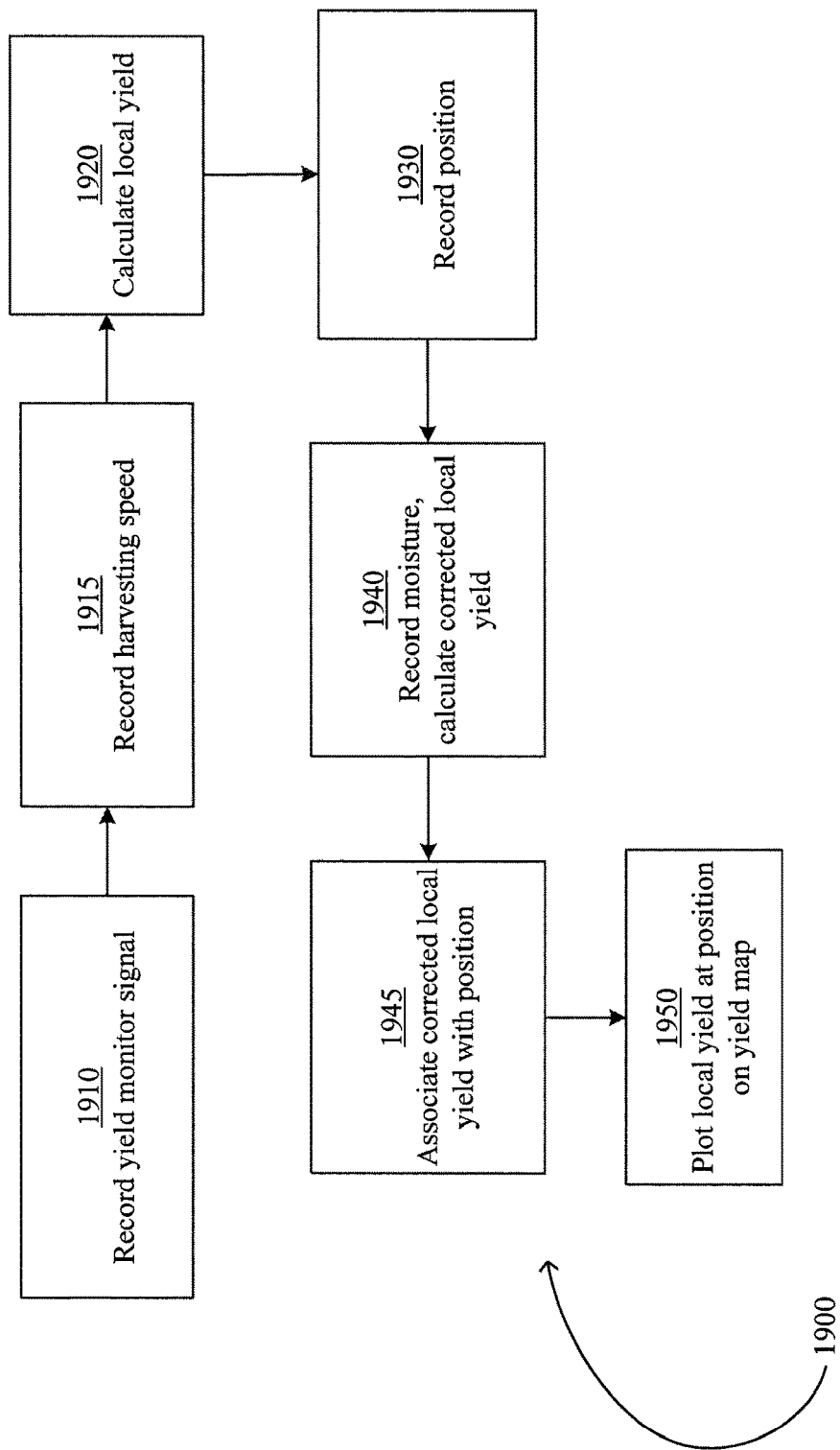
FIG. 19 illustrates an embodiment of a process for generating a yield map.

FIG. 19 illustrates a method designated generally by reference numeral 1900 for generating a yield map using the yield monitoring system 400. At step 1910, the yield sensor assembly 100 generates a yield monitor signal which is preferably recorded and time-stamped by the yield monitor board 450. At step 1915, the global positioning receiver 430 (or a speed sensor such as an axle-mounted Hall-effect speed sensor as is known in the art) preferably reports the harvesting speed of the combine 300 to the yield monitor board 450, which preferably records and time-stamps the speed data. At step 1920, the yield monitor board 450 preferably calculates the local yield by, e.g., calculating the mass flow rate of grain and deriving the local yield from the mass flow rate of grain using, e.g., the speed of the combine 300 and the width of the head 315. At step 1930, the global positioning receiver 430 preferably reports the position data (e.g., global positioning coordinates) corresponding to the position of the combine 300 to the yield monitor board 450, which preferably records and timestamps the position data. At step 1940, the moisture sensor 420 preferably reports the current grain moisture to the yield monitor board 450, which preferably calculates a corrected local yield based on the grain moisture. At step 1945, the yield monitor board 420 preferably associates recorded positions with corrected local yields recorded at corresponding times. At step 1950, the yield monitor board 450 preferably reports the local yield and corresponding location to the graphical user interface 440 and the graphical user interface 440 generates a map including a graphical depiction of the corrected local yield at the location.

Yield Monitor Calibration Methods

Figure 20:
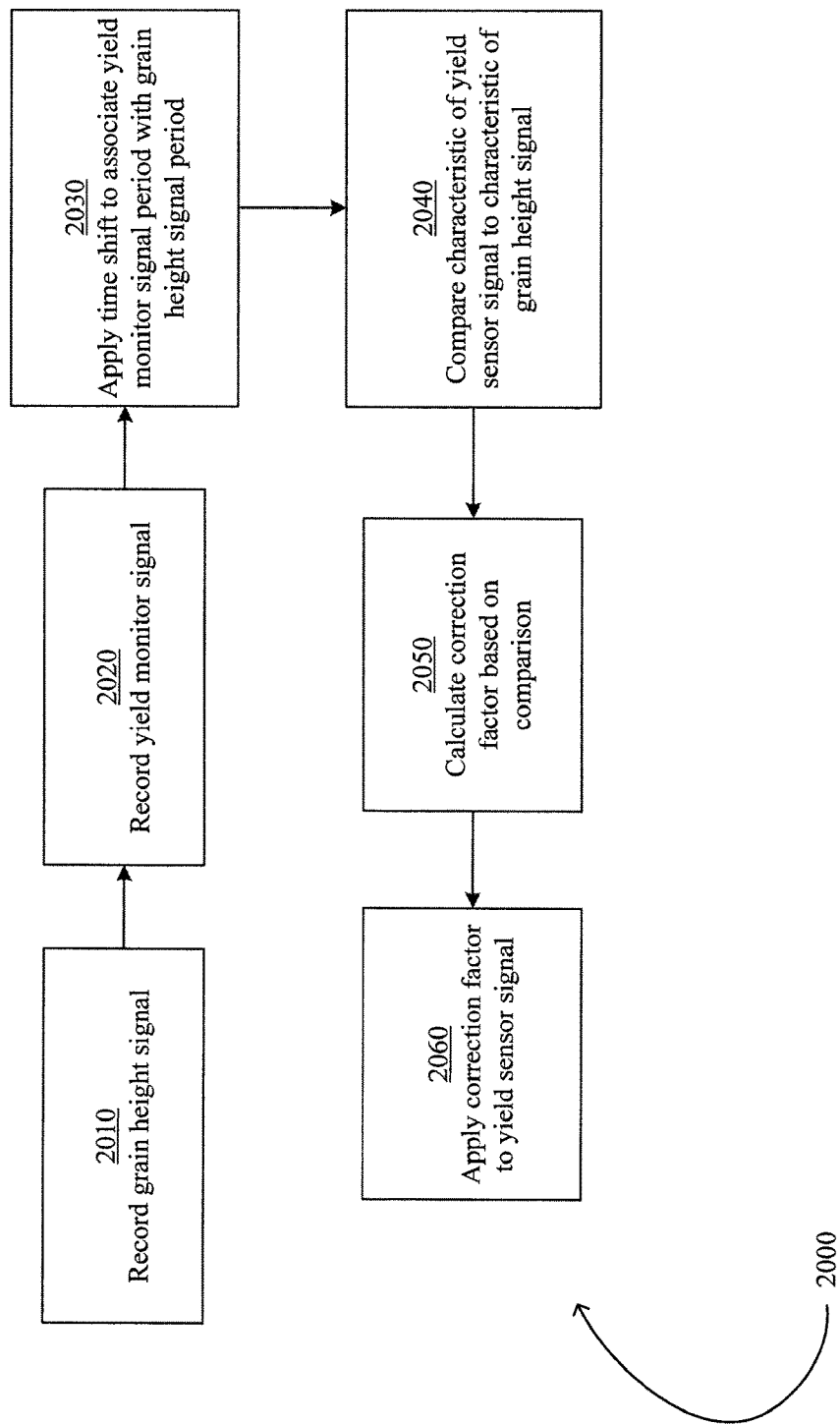
FIG. 20 illustrates an embodiment of a process for calibrating a yield sensor using a grain height sensor signal.

FIG. 20 illustrates a process designated generally by reference numeral 2000 for calibrating a yield sensor with the grain height sensor 410. At step 2010, the grain height sensor 410 generates a signal related to the amount of grain on the flights 32, which signal is preferably recorded by the yield monitor board 450. In other embodiments, step 2010 is carried out using another sensor configured to measure the amount of grain being processed by the combine 300. At step 2020, the yield sensor assembly 100 generates a yield monitor signal related to the force of grain against a sensing surface, which signal is preferably recorded by the yield monitor board 450. In some embodiments, step 2020 is carried out using a yield sensor assembly such as yield sensor assembly 100. In other embodiments, step 2020 is carried out using an impact-type yield sensor paddle (e.g., the impact-type yield paddle 40 illustrated in FIG. 2). At step 2030, the yield monitor board 450 preferably applies a time shift to either the yield monitor signal or the grain height signal corresponding to the time between the grain height sensor and yield sensor assembly measurements. At step 2040, the yield monitor board 450 preferably compares a characteristic of the yield sensor signal to the same characteristic of the grain height signal (e.g., by comparing the sum of the yield sensor signal to the sum of the grain height signal over corresponding periods). At step 2050, the yield monitor board 450 preferably determines a correction factor based on the comparison (e.g., by dividing the sum of the grain height signal by the sum of the yield sensor signal over corresponding periods). At step 2060, the yield monitor board 450 preferably applies the correction factor to the yield sensor signal (e.g., by multiplying the correction factor by the yield sensor signal) and reports the corrected yield sensor signal to the graphical user interface 440.

Test Weight and Volumetric Flow Rate Measurement Methods

The yield measurement systems disclosed herein are preferably configured to determine the volumetric flow rate of grain through the clean grain elevator 30 based on the signal generated by the yield sensor during harvesting operations.

Figure 23:
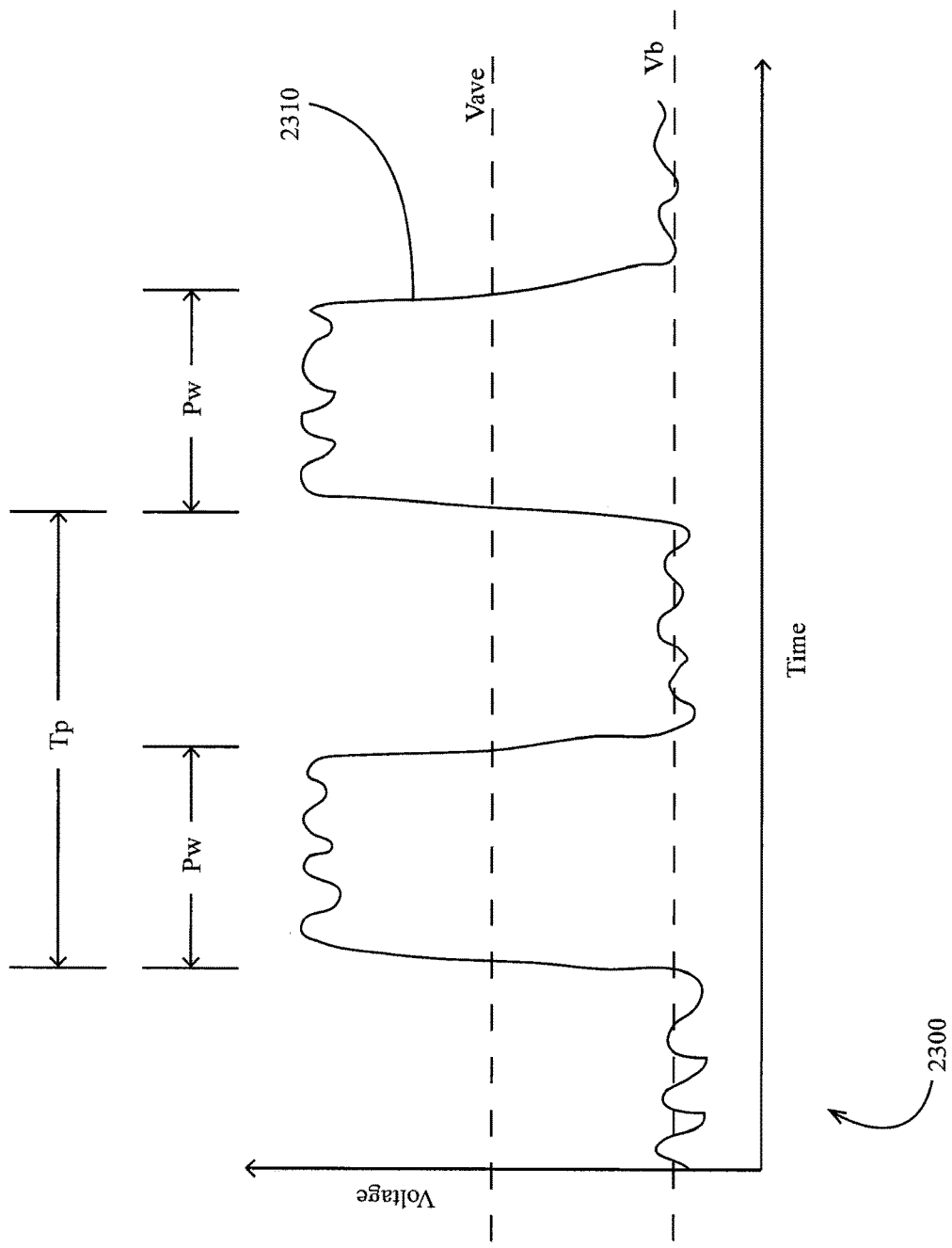
FIG. 23 is a graph of a yield sensor signal.

Turning to FIG. 23, a representative graph 2300 illustrates a signal 2310 generated by the yield sensor as grain piles 50 impact the sensor surface. A base voltage Vb represents the signal emitted when no grain contacts the sensor surface. The average value of the signal over time is represented by average voltage Vave. A period Tp of the signal may be measured by measuring the time delay between the first crossings of average voltage Vave. A pulse width Pw of the signal may be measured by measuring the time delay between the first and second crossings of the average voltage Vave. It should be appreciated in light of the instant disclosure that because the grain piles on each flight is compressed into a substantially discrete, contiguous shape against the yield sensor, the signal 2310 includes discrete pulses having measurable pulse width Pw. The pulse width Pw is related to the volumetric flow rate of grain.

Figure 24:
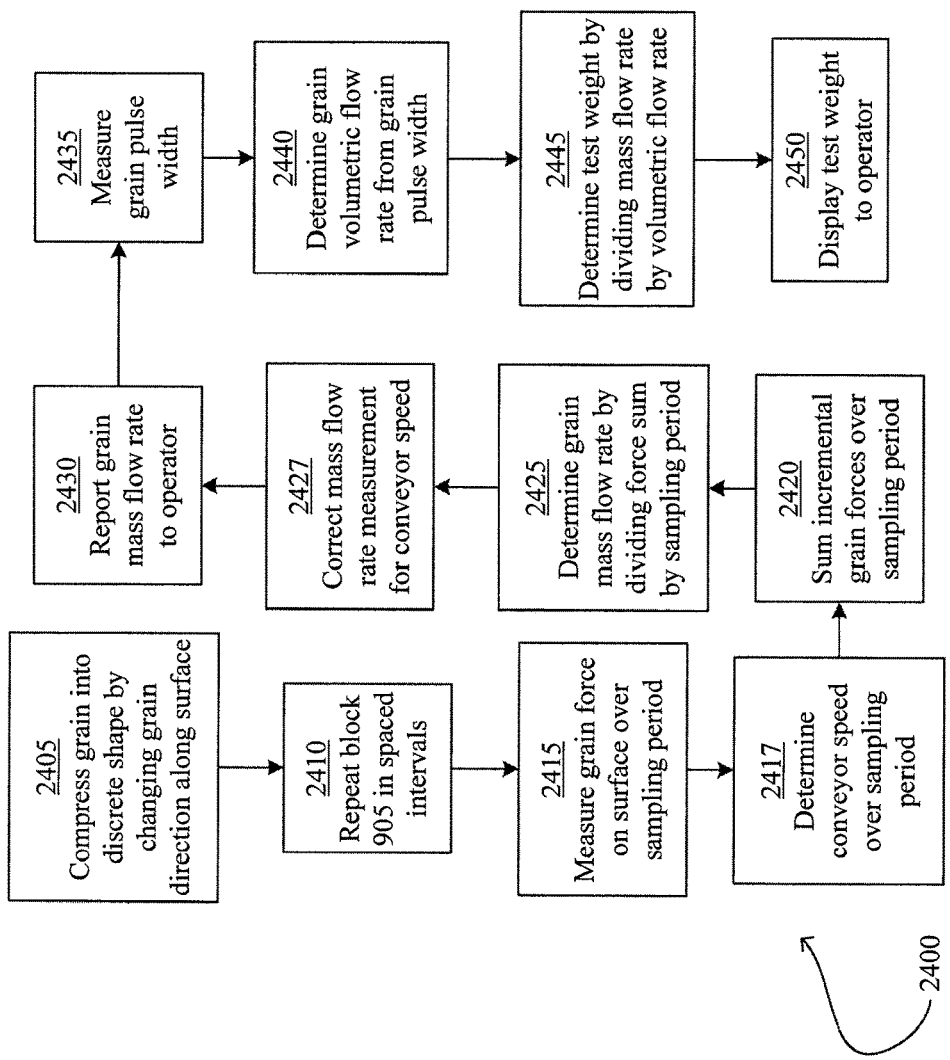
FIG. 24 illustrates a process for determining the mass flow rate, volumetric flow rate, and test weight of grain.

Turning to FIG. 24, a process 2400 for determining mass flow rate, volumetric flow rate, and test weight of grain is illustrated. At step 2405, grain is compressed into a discrete shape (e.g., as illustrated in FIG. 4B) by changing its direction along a surface (e.g., the inner surface the housing 20 and the sensor surface 122). At step 2410, the step of step 2405 is repeated at discrete, spaced intervals. At step 2415, the grain force on the surface is measured over a sampling period, resulting in a signal such as signal 2310 in FIG. 23. At step 2417, the operational speed of the conveyor 30 is preferably determined either by a separate sensor such as a shaft encoder, or by calculating it based on the period Tp of the signal, which is inversely related to conveyor speed. At step 2420, the grain forces are integrated or summed over the sampling period by multiplying the sum of voltage V by an empirical constant k1 relating voltage to mass flow rate. At step 2425, the mass flow rate in of the grain is determined by dividing the sum of grain forces over the sampling period by the duration T of the sampling period, e.g., using the relation:

$$\dot{m} = \frac{\Sigma k_1 V + k_2}{T_p}$$

Where: k2 is an empirical offset.

At step 2427, the mass flow rate measurement obtained in step 2425 is preferably corrected by comparing the conveyor speed to a reference speed and applying a correction factor related to said comparison. At step 2430, the grain mass flow rate is preferably displayed on the graphical user interface 440. At step 2435, the pulse width Pw of the signal is preferably measured. At step 2440, volumetric flow rate $\dot{V}$ is preferably calculated based on the pulse width Pw, e.g., using the following relation:

$$\dot{V} = k_3(P_w - k_4)$$

Where: k3 and k4 are an empirical multiplier and offset, respectively.

At step 2445, a test weight of the grain is preferably determined by dividing the mass flow rate of grain by the volumetric flow rate and performing any additional mathematical operations necessary to arrive at a standardized test weight. It should be appreciated that the standard test weight (e.g., of corn) is the weight in pounds of a bushel (1.244 cubic feet) of crop. At step 2450, the test weight is preferably displayed to the operator on the monitor.

Alternative Yield Sensor Embodiments

Figure 21:
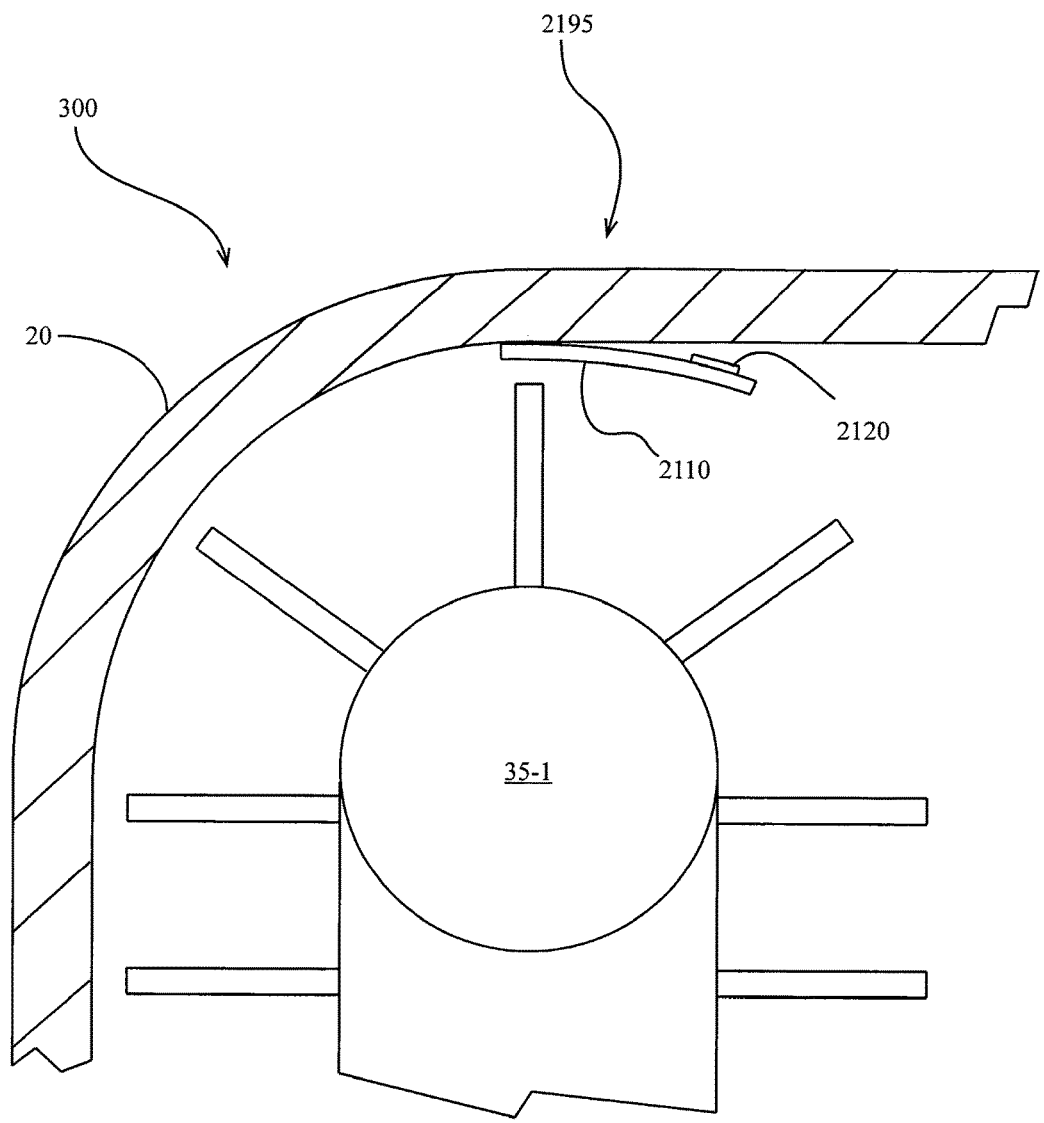
FIG. 21 illustrates a side elevation view of an upper portion of a clean grain elevator with another embodiment of a yield sensor assembly.

FIG. 21 illustrates an alternative yield sensor 2195. The yield sensor 2195 includes a deformable sheet 2110 having a fixed end mounted to the housing 20 above the apex of the elevator 30 and a free end disposed downstream of the fixed end along the direction of grain travel. The deformable sheet 2110 is provided with instrumentation 2120 (e.g., strain gauges or a pressure transducer) in electrical communication with a yield monitor. The instrumentation 2120 is preferably mounted on an upper side of the sheet 2110. In operation, successive grain layers pass along the surface of the deformable sheet 2110 such that the free end of the deformable sheet is deflected upward by centrifugal forces imparted to the grain by the elevator 30.

Figure 22A:
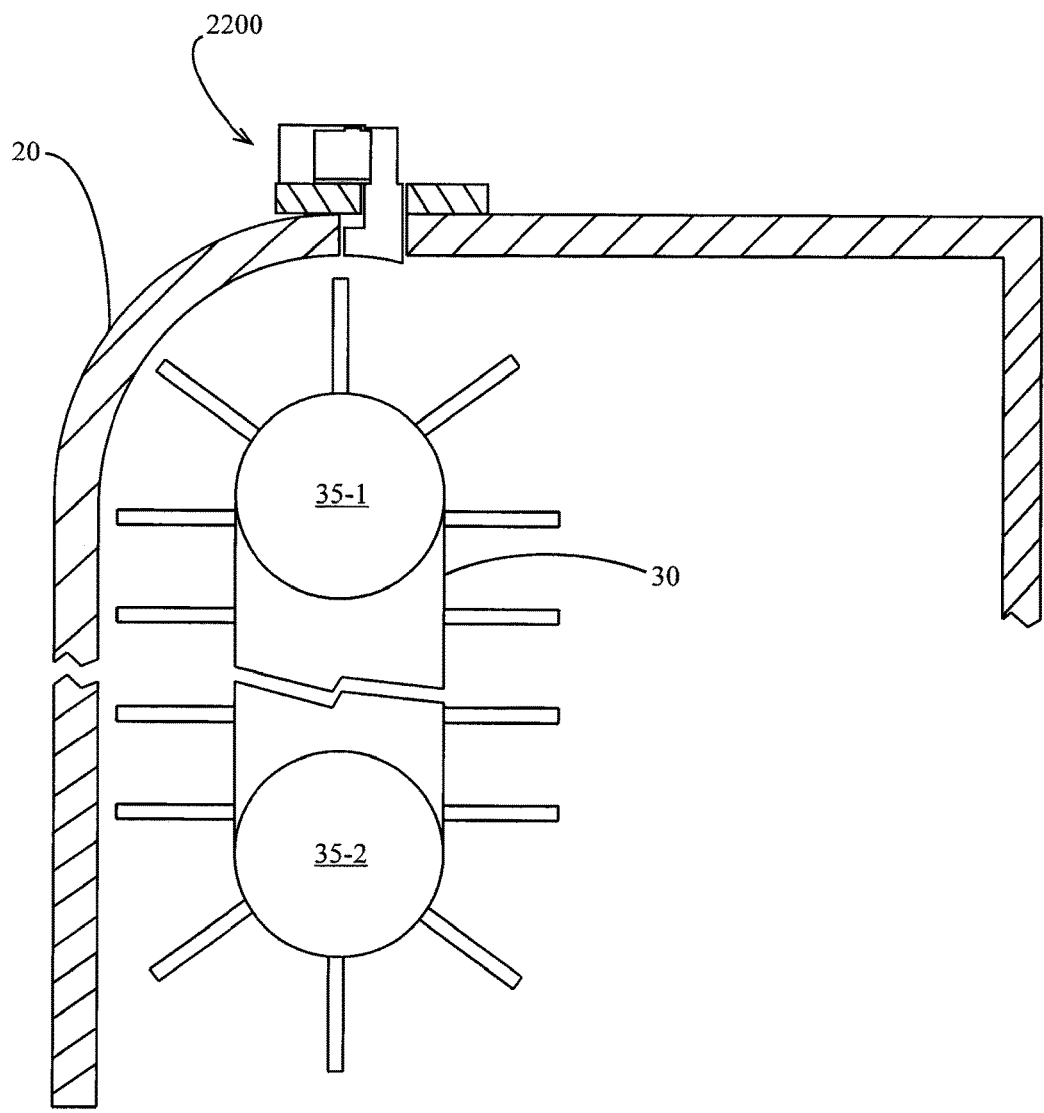
FIG. 22A illustrates a side elevation view of a clean grain elevator with a side view of still another embodiment of a yield sensor assembly.
Figure 22B:
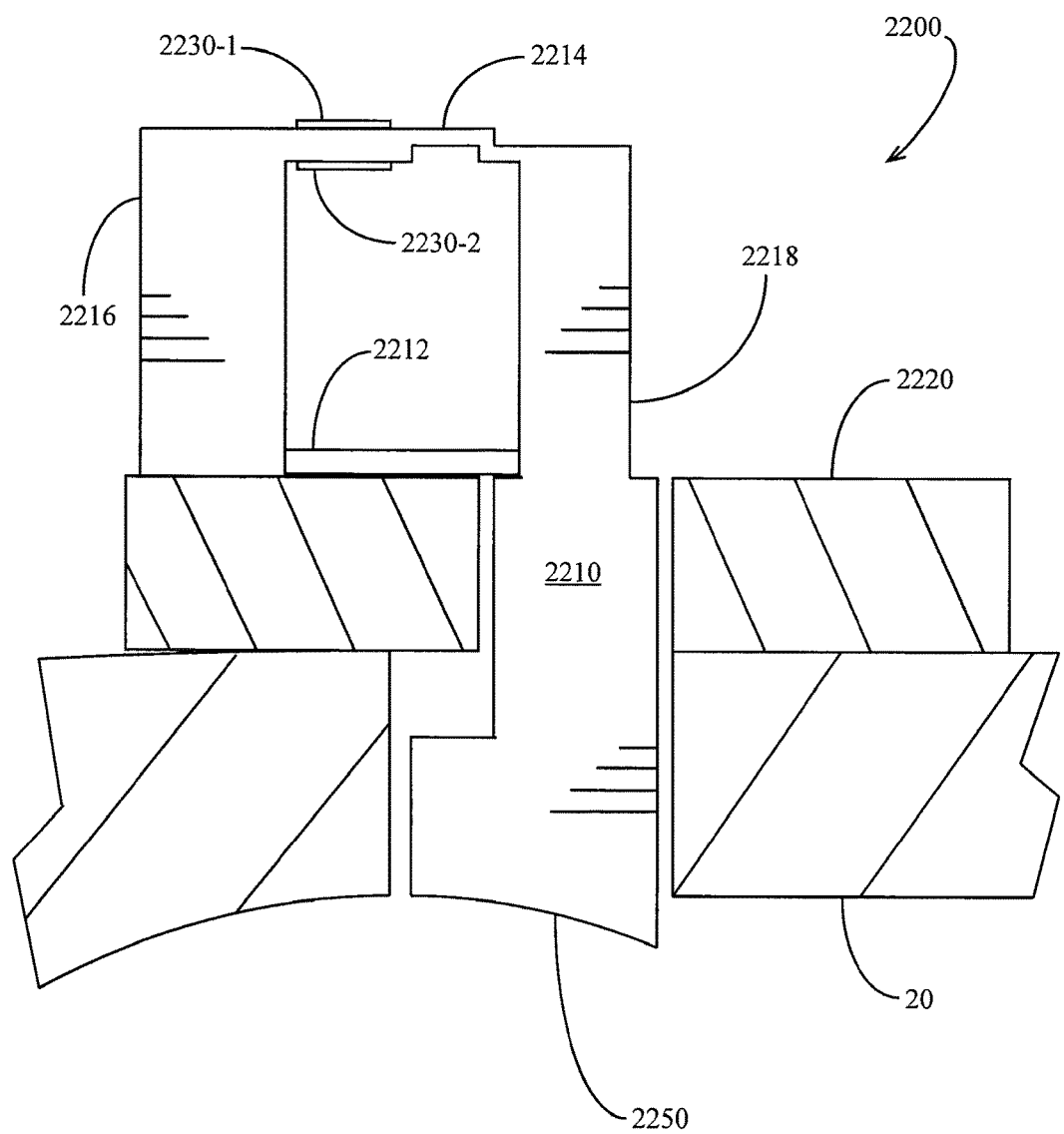
FIG. 22B is an enlarged side view of the yield sensor assembly of FIG. 22A.

FIG. 22A illustrates another alternative yield sensor 2200 located in a preferred location above the apex of the elevator 30. Turning to FIG. 22B, the yield sensor 2200 includes a mounting bracket 2220 mounted to an upper side of the housing 20. The yield sensor 2200 includes a sensor body 2210 extending through an aperture in the mounting bracket 2220 and through an aperture provided in housing 12 such that a sensor face 2250 of the sensor body 2210 is at least partially aligned with an inner surface of the housing 20. The sensor surface 2250 preferably descends along the direction of grain travel. The sensor surface 2250 is preferably arcuate. In some embodiments, the sensor surface 2250 has a curvature substantially equal to that of the inner surface of the housing 20 at a location adjacent to the sensor surface 130 (to the left along the view of FIG. 22B).

Continuing to refer to FIG. 22B, the sensor body 2210 includes an upper portion 2218 coupled to a stationary tower 116 by upper and lower displacement arms 2214,2212. Lower displacement arm 2212 is preferably a thin sheet of metal (e.g., having a thickness between 0.01 inches and 0.02 inches) and is mounted at a first end to stationary tower 116 and mounted at a second to the upper portion 2218 of the sensor body 110. Upper displacement arm 2214 is preferably thicker than lower displacement arm 2212. Upper and lower strain gauges 2230-1,2230-2 are preferably mounted to upper and lower surfaces, respectively, of the upper displacement arm 2214. Strain gauges 2230-1,2230-2 are preferably in electrical communication with a graphical user interface located in the combine cab. Stationary tower 116 is mounted to mounting bracket 2220. In operation, sequential layers of grain pass across the sensor surface 2250, displacing the sensor body 2210 upward and imposing strain on strain gauges 2230-1,2230-2 such that a signal generated by the strain gauges is related to the upward translation of the sensor body.

Figure 22C:
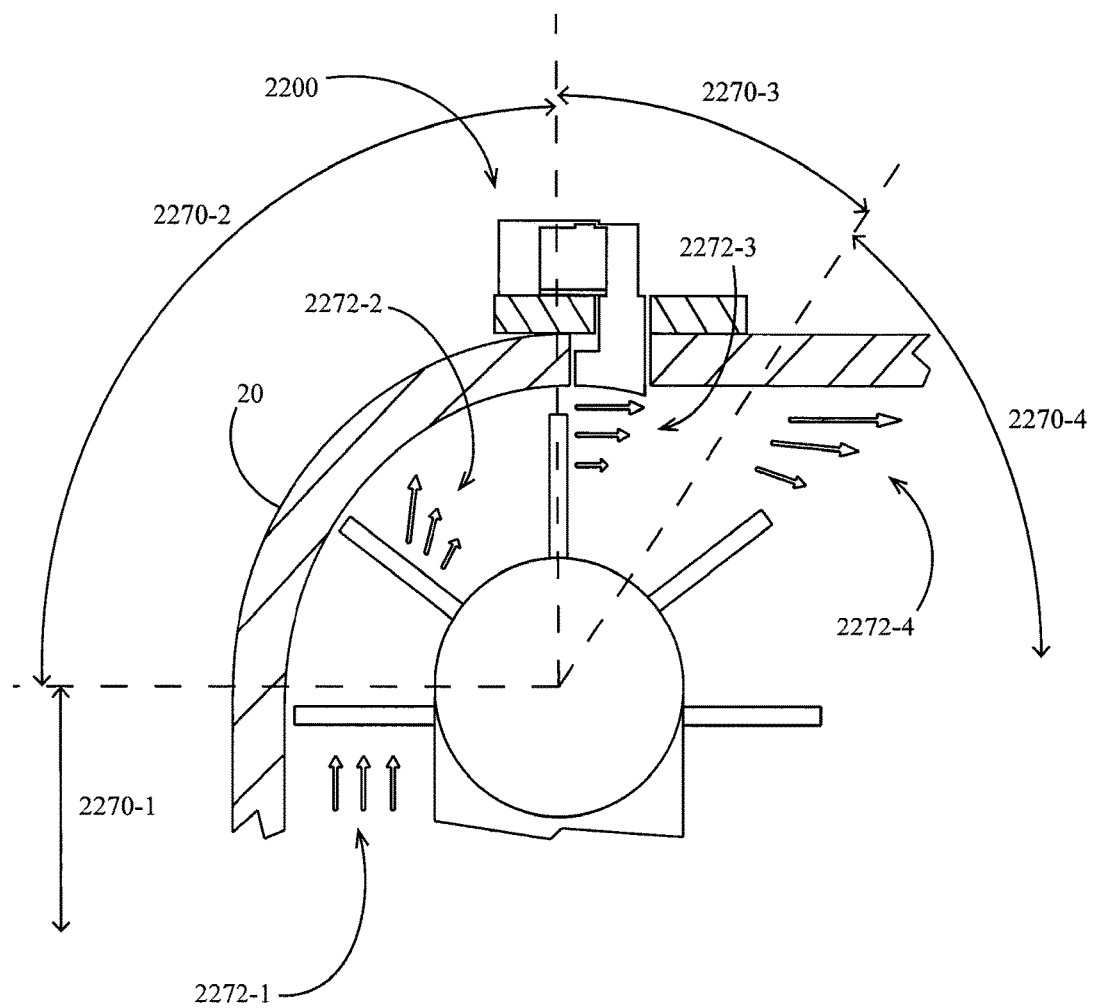
FIG. 22C is another side view of the yield sensor assembly of FIG. 22A illustrating velocity profiles of grain within a clean grain elevator housing.

Turning to FIG. 22C, velocity profiles 2272 of cross-sections of grain piles 50 vary between several zones 2270. In zone 2270-1, the grain velocity is substantially uniform and substantially vertical. In zone 2270-2, the magnitude of grain velocity, as well as the relative magnitude of the vertical component of grain velocity, increases with distance from the conveyor 20. In zone 2270-3, the magnitude of grain velocity still increases with distance from conveyor 20, but grain within the zone 2270-3 preferably has a velocity substantially parallel to the sensor surface. In zone 2270-4, the velocity of the grain is inconsistent in both magnitude and direction. The sensor surface 2250 of the yield sensor 2200 is preferably disposed to contact grain in zone 2270-3. It should be appreciated that in operation of the yield sensor 100 disclosed earlier herein, grain contacts the sensor surface 122 in zone 2270-3 such that the velocity of grain immediately prior to contact with the sensor surface 122 is substantially parallel to the sensor surface; the velocity of the grain pile 50 is also preferably substantially parallel to the sensor surface 122 while in a portion of the grain pile is in contact with the sensor surface. Thus the force imposed by grain contacting the sensor surface in the yield sensor 100 and the yield sensor 2200 is preferably comprised substantially of centrifugal force rather than impact force.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A sensor for measuring yield harvested by a harvesting machine, comprising:
a sensor disposed in a harvesting machine, the harvesting machine having a grain elevator housing with elevator flights configured to carry clean grain between a lower sprocket and an upper sprocket disposed within the grain elevator housing, whereby the elevator flights throw the clean grain in the direction of the sensor as the elevator flights pass over the upper sprocket, the upper sprocket and the lower sprocket defining an elevator plane, the elevator flights having edges that define a first plane and a second plane, the first plane and the second plane being parallel to the elevator plane, the first plane defined by the elevator flights traveling from the lower sprocket to the upper sprocket, the second plane defined by the elevator flights traveling from the upper sprocket to the lower sprocket, wherein the sensor is disposed above the upper sprocket between the first plane and the second plane.

2. The sensor of claim 1, wherein the sensor has a sensor surface, and the clean grain that contacts said sensor surface has a velocity component substantially parallel to the sensor surface immediately prior to contacting the sensor surface.

3. The sensor of claim 2, wherein the clean grain has a velocity component substantially parallel to the sensor surface while contacting the sensor surface.

4. The sensor of claim 1, wherein the sensor has a sensor surface, and a pre-sensor surface adjacent to the sensor surface, said pre-sensor surface configured to allow the clean grain to flow substantially continuously from said pre-sensor surface to said sensor surface such that a velocity component of the clean grain retains substantially the same direction as the clean grain flows from said pre-sensor surface to said sensor surface.

5. The sensor of claim 4, wherein a distance between said pre-sensor surface and said sensor surface is vertically offset by less than ten hundredths of an inch.

6. The sensor of claim 4, further including a post-sensor surface adjacent to the sensor surface, said post-sensor surface configured to allow the clean grain to flow substantially continuously from said sensor surface to said post-sensor surface such that the velocity component of the clean grain retains substantially the same direction as the clean grain flows from said sensor surface to said post-sensor surface.

7. The sensor of claim 1, wherein the sensor has a sensor surface, and translational movement of said sensor surface is less than 10 hundredths of an inch.

8. The sensor of claim 1, wherein the sensor has a sensor surface, and the sensor further comprises a displacement sensor disposed to measure translational movement of said sensor surface.

9. The sensor of claim 8, wherein while said sensor surface is subject to translational movement due to the clean grain contacting said sensor surface, said sensor surface remains substantially undeformed by contact with the clean grain.

10. The sensor of claim 1, wherein the sensor has a sensor surface, and the sensor further comprises a first spring and a second spring, wherein said first spring and said second spring resiliently retain the sensor surface in a first non-translated position.

11. The sensor of claim 1, wherein the sensor has a natural frequency greater than 400 hertz.

12. The sensor of claim 1, wherein the sensor is disposed on an inner surface of the grain elevator housing.

13. The sensor of claim 12, wherein the sensor is a displaceable sheet having a fixed end mounted to the grain elevator housing, a free end disposed downstream of the fixed end along a direction of grain travel, and having instrumentation attached to the displaceable sheet.

14. The sensor of claim 13, wherein the instrumentation is attached to an upper side of the displaceable sheet.

15. The sensor of claim 1, wherein the sensor is disposed within a hole in the grain elevator housing.

16. The sensor of claim 15, wherein the sensor has a sensor body that extends through the hole, and a sensor surface that is at least partially aligned with an inner surface of said grain elevator housing.

17. The sensor of claim 16, wherein the sensor surface has a curvature substantially equal to that of the inner surface of the grain elevator housing at a location adjacent to the sensor surface before the sensor surface in a direction of grain travel.

18. The sensor of claim 17, wherein the sensor body includes an upper portion coupled to a stationary tower by an upper displacement arm and a lower displacement arm, and an upper strain gauge is disposed on a top side of said upper displacement arm, and a lower strain gauge is disposed on a lower side of said upper displacement arm.

19. The sensor of claim 18, wherein said upper displacement arm is thicker than said lower displacement arm.

20. The sensor of claim 16, wherein the sensor body includes an upper portion coupled to a stationary tower by an upper displacement arm and a lower displacement arm, and an upper strain gauge is disposed on a top side of said upper displacement arm, and a lower strain gauge is disposed on a lower side of said upper displacement arm.

\* \* \* \* \*